United States Patent
Umeno et al.

(10) Patent No.: US 6,264,292 B1
(45) Date of Patent: Jul. 24, 2001

(54) WHEEL CONDITION ESTIMATING APPARATUS

(75) Inventors: Takaji Umeno; Katsuhiro Asano; Eiichi Ono; Hiroyuki Yamaguchi; Masaru Sugai, all of Aichi-ken (JP)

(73) Assignee: Kabushiki Kaisha Toyota Chuo Kenkyusho, Aichi-gun (JP)

(*) Notice: Subject to any disclaimer, the term of this patent is extended or adjusted under 35 U.S.C. 154(b) by 0 days.

(21) Appl. No.: 09/118,016

(22) Filed: Jul. 17, 1998

(30) Foreign Application Priority Data

Jul. 18, 1997 (JP) .................................................. 9-209780

(51) Int. Cl.[7] ...................................................... B60T 8/32
(52) U.S. Cl. ........................ 303/196; 303/163; 303/191; 303/194
(58) Field of Search ........................................ 303/163, 149, 303/150, 148, 194, 195, 196, 112, 191, 146

(56) References Cited

U.S. PATENT DOCUMENTS

| 4,807,133 | * | 2/1989 | Shimanuki et al. | 303/196 |
|---|---|---|---|---|
| 4,965,729 | * | 10/1990 | Hafner | 303/196 |
| 5,105,359 | * | 4/1992 | Okubo | 303/196 |
| 5,588,721 | | 12/1996 | Asano et al. | 303/163 |
| 5,662,393 | * | 9/1997 | Kamiya et al. | 303/194 |
| 5,826,207 | * | 10/1998 | Ohashi et al. | 701/36 |
| 5,878,365 | * | 3/1999 | Onogi et al. | 303/191 |
| 5,948,961 | * | 9/1999 | Asano et al. | 73/9 |
| 5,982,279 | * | 11/1999 | Tominaga et al. | 340/444 |

FOREIGN PATENT DOCUMENTS

| 196 22 698 | 12/1996 | (DE) . |
|---|---|---|
| 0 699 568 | 3/1996 | (EP) . |
| 0 747 691 | 12/1996 | (EP) . |

* cited by examiner

Primary Examiner—Robert J. Oberleitner
Assistant Examiner—Mariano Sy
(74) Attorney, Agent, or Firm—Oblon, Spivak, McClelland, Maier & Neustadt, P.C.

(57) ABSTRACT

In a wheel condition estimating apparatus for estimating a wheel condition in a wheel resonance system including a frictional characteristic between a tire and a road surface, a transfer characteristic of the wheel resonance system from the vibration input to the output response is expressed by a transfer function including, as an unknown component of a wheel condition, a physical quantity relating to ease of a slipping between the tire and the road surface, an output response with respect to the vibration input to the wheel resonance system is detected and the unknown component which substantially satisfies the detected output response is estimated on the basis of the transfer function.

24 Claims, 29 Drawing Sheets

FIRST EMBODIMENT, BLOCK DIAGRAM OF FIRST ASPECT

FRICTIONAL CHARACTERISTIC BETWEEN TIRE AND ROAD SURFACE

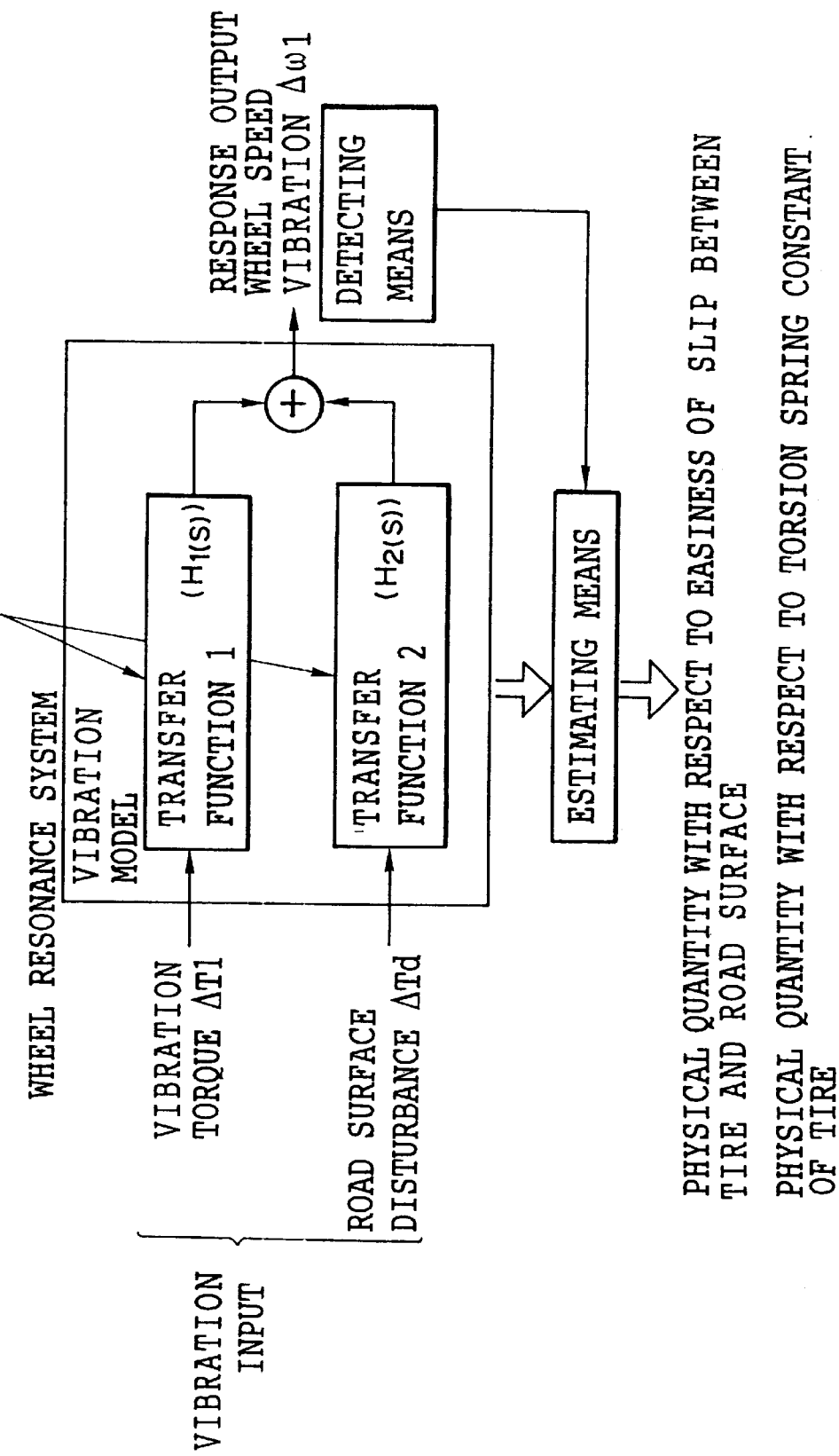

FREQUENCY CHARACTERISTIC OF
WHEEL RESONANCE SYSTEM

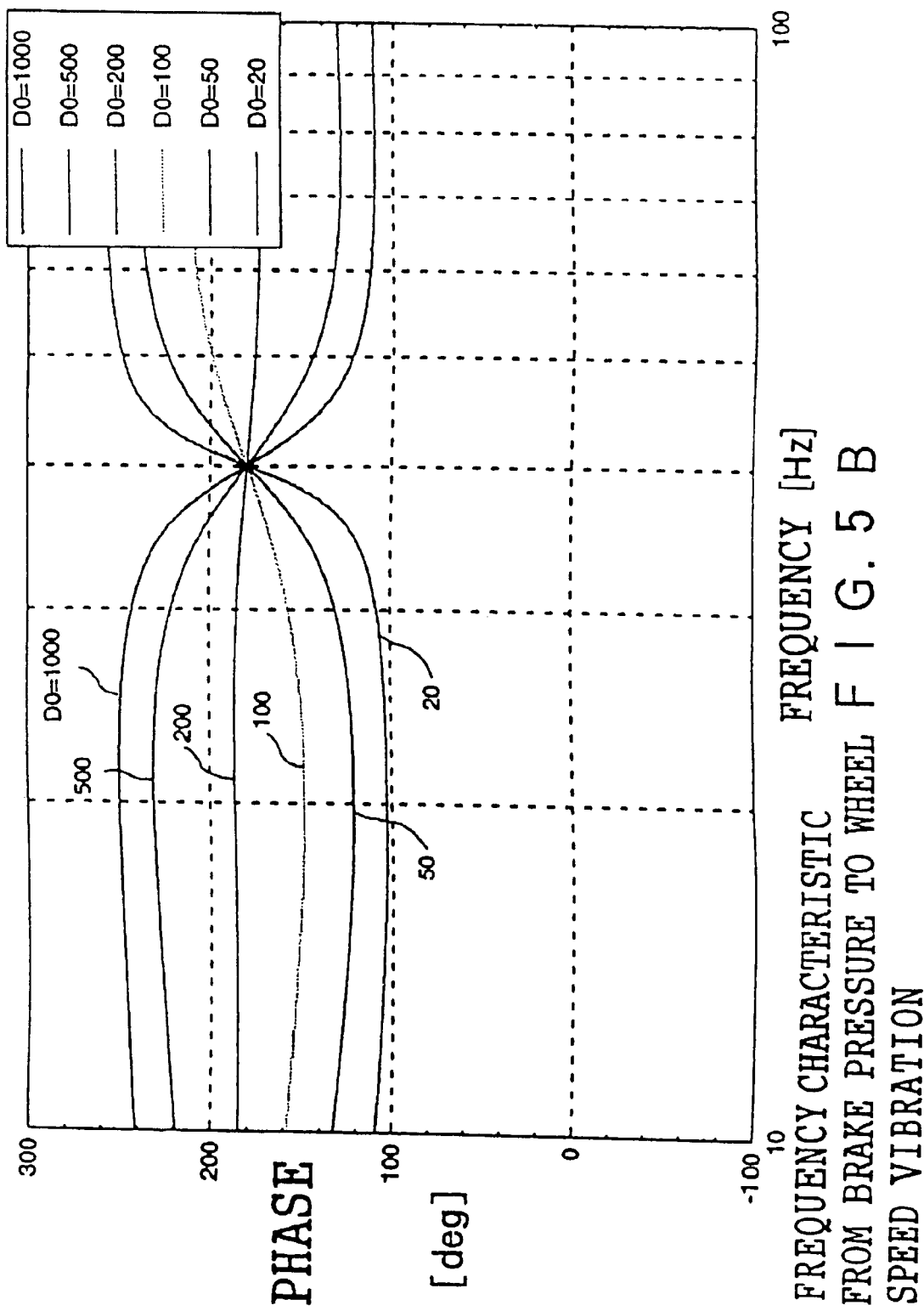
FIG. 5B FREQUENCY CHARACTERISTIC FROM BRAKE PRESSURE TO WHEEL SPEED VIBRATION

ASPHALT ROAD

DIRT ROAD

FREQUENCY ANALYZING RESULT
OF WHEEL SPEED SIGNAL IN DRIVE WHEEL

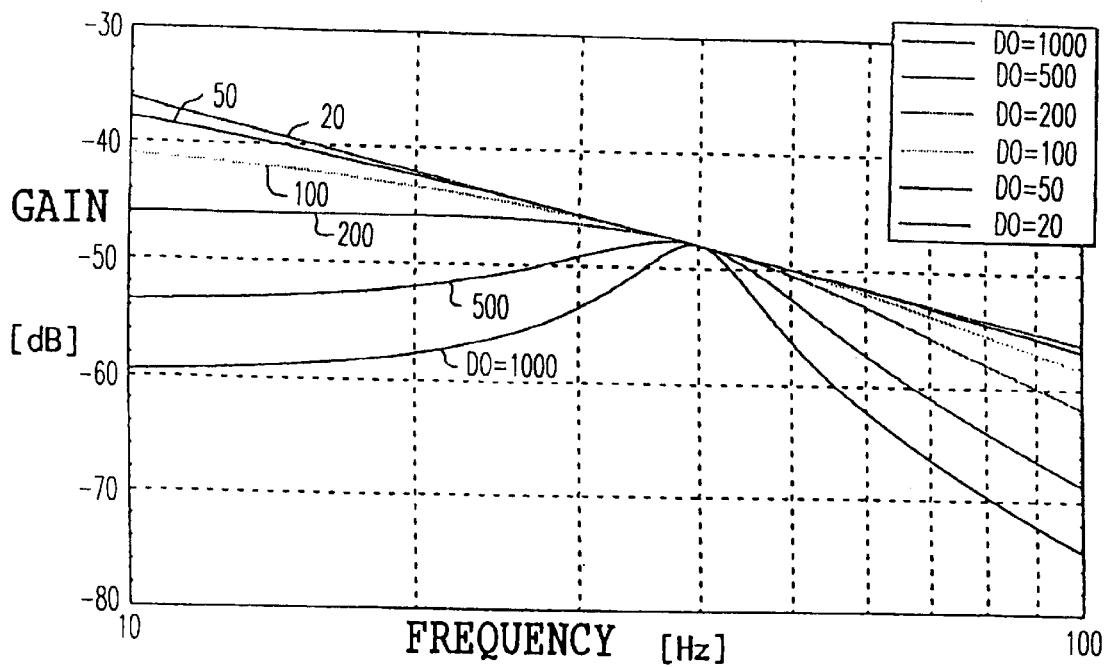
F I G. 7 A
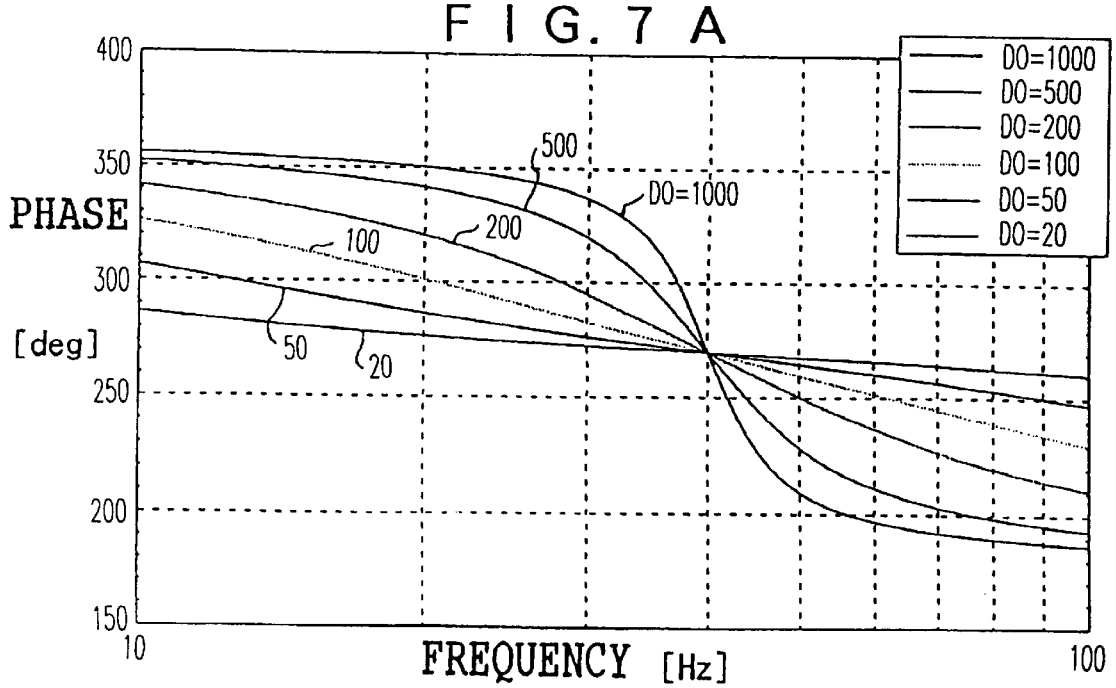
F I G. 7 B
FREQUENCY CHARACTERISTIC FROM ROAD
SURFACE DISTURBANCE TO
WHEEL SPEED VIBRATION

FIRST EMBODIMENT, BLOCK DIAGRAM OF FIRST ASPECT

FIG. 9 FIRST EMBODIMENT, BLOCK DIAGRAM OF SECOND ASPECT

ESTIMATING RESULT OF D0

FIG.11 BLOCK DIAGRAM OF SECOND EMBODIMENT

ESTIMATED RESULT
OF RESONANCE FREQUENCY

THIRD EMBODIMENT, BLOCK DIAGRAM OF SECOND ASPECT

FIG. 17 FOURTH EMBODIMENT, BLOCK DIAGRAM OF SECOND ASPECT

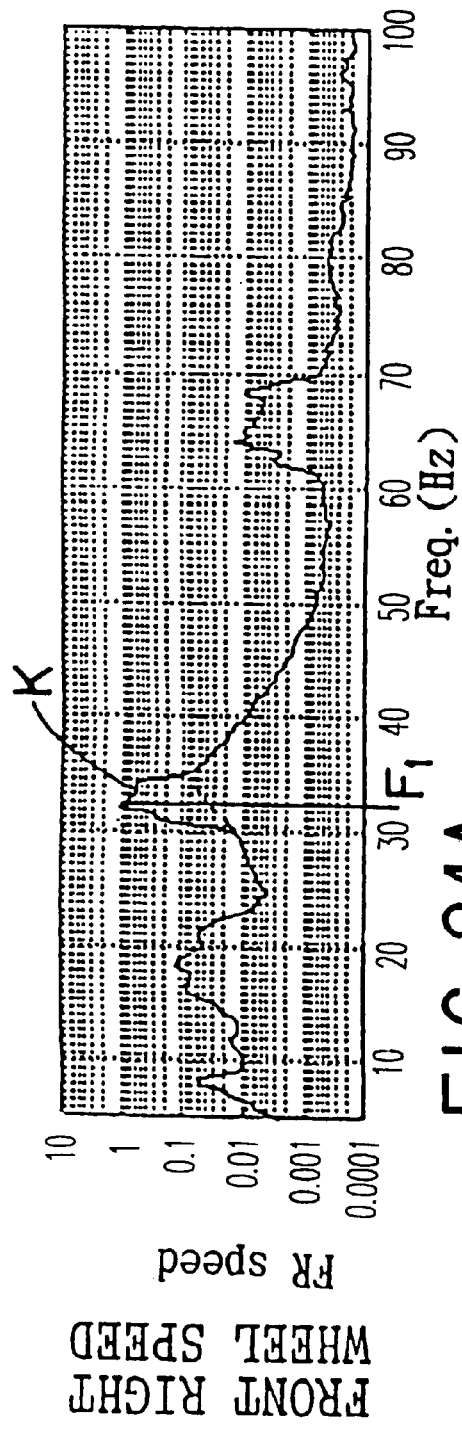
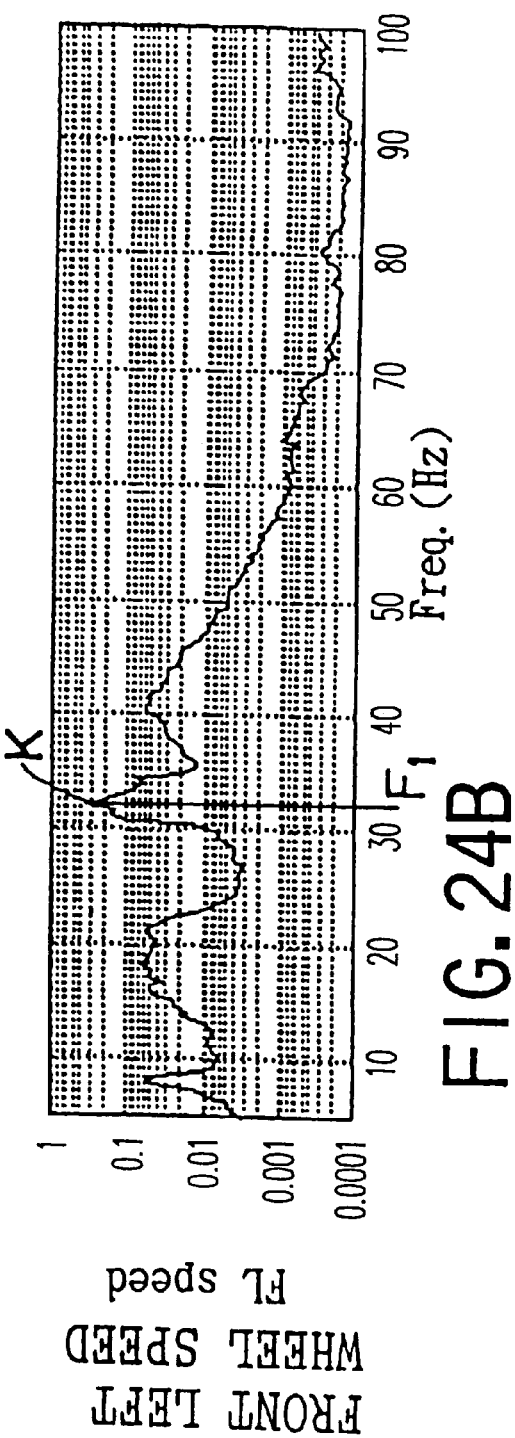

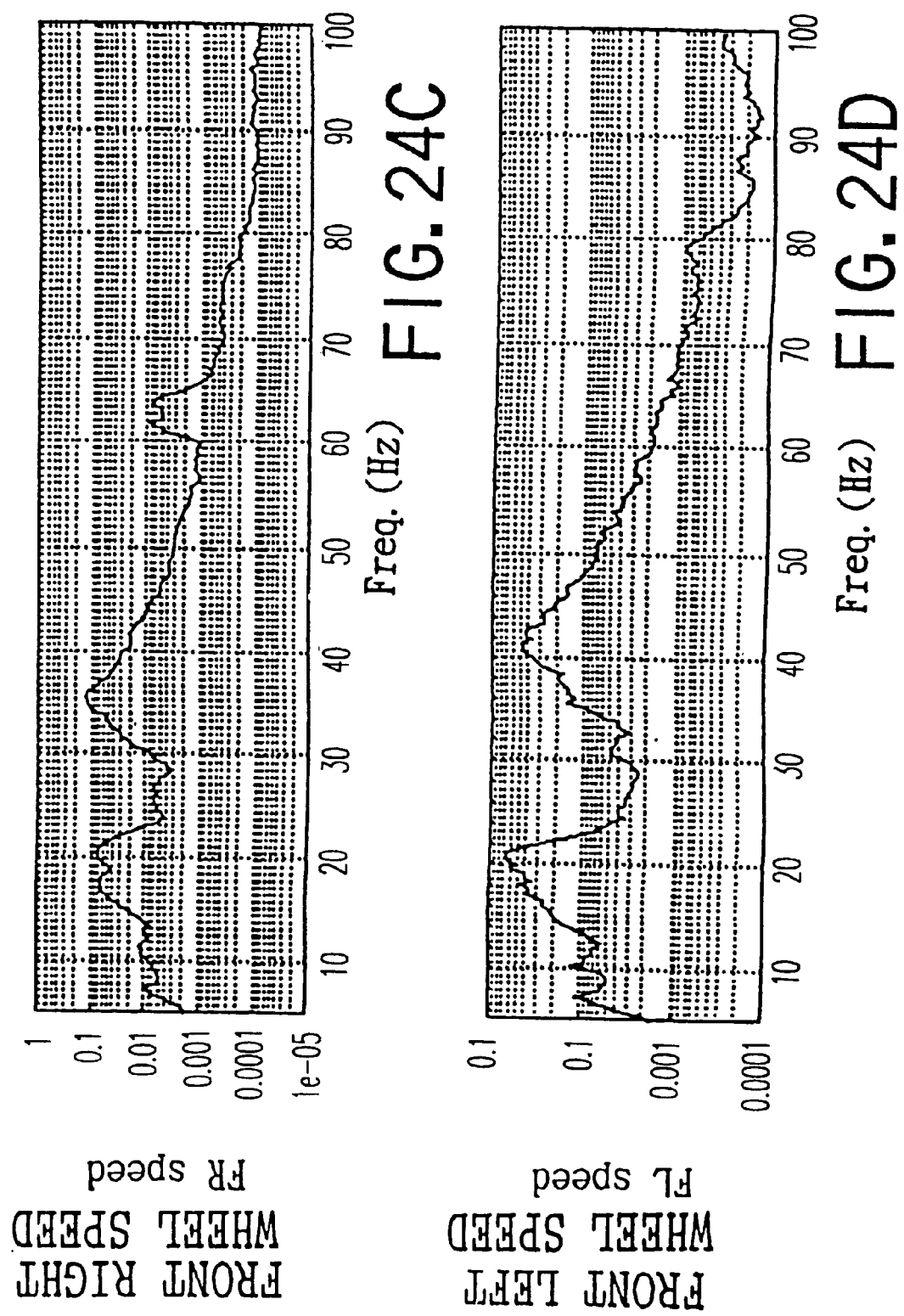

WHEEL CONDITION ESTIMATING APPARATUS

BACKGROUND OF THE INVENTION

1. Field of the Invention

The present invention relates to a wheel condition estimating apparatus, and more particularly to a wheel condition estimating apparatus for estimating a wheel condition from an output response or the like of a wheel resonance system on the basis of a vibration model of the wheel resonance system including a frictional characteristic between a tire and a road surface.

2. Description of the Related Art

In recent years, in accordance with an increase in efforts to improve the safety of automotive vehicles, preventative safety techniques have been researched and developed. An antilock brake systems (ABS), which are a representative safety apparatus, have already been used in many vehicles.

ABS control on the basis of a new principle which pays attention to the resonance phenomenon of the tire has been proposed, and the study thereof continues (Japanese Patent Application No. 7-220920 and the like). This technique is such that a micro vibration having a frequency component equal to a resonance frequency when the tire grips a road is applied to the brake pressure, and the average brake pressure is controlled on the basis of a resonance gain (micro amplitude of wheel speed at the resonance frequency/vibration amplitude of brake pressure) of a tire resonance system at that time.

It is known that the resonance gain is a physical quantity related to the gradient of a coefficient of friction $\mu$ with respect to a slip ratio S (hereinafter referred to as a $\mu$ gradient) of a coefficient $\mu$ of friction in a so-called S-$\mu$ characteristic (a changing curve of a coefficient of friction $\mu$ with respect to a Slip ratio S). It is expected that a frictional characteristic, which relates to ease of slipping between a tire and a road surface at a time of braking, can be estimated on the basis of the resonance gain.

However, since the prior art mentioned above presupposes that the resonance frequency of the tire resonance system is known, there is a problem that it cannot immediately respond in the case that the resonance frequency changes due to the tire being replaced or the air pressure in the tire changing. For example, when the air pressure in the tire falls, the resonance frequency at the time when the tire grips the road surface changes to a lower side. Therefore, the value of the resonance gain becomes small, and the accuracy of detecting whether the current state is a state immediately before a peak $\mu$ value by comparison with a predetermined reference gain deteriorates.

Further, in the above-described prior art, the brake pressure is minutely vibrated at a time of calculating the resonance gain. However, because the micro vibration can be applied only at a time of braking due to the structure of a brake portion, there is a problem that the opportunity to estimate the road surface condition is limited to the time of braking in the case of a vehicle having the brake portion of this type. Still further, there are cases in which micro vibration of the brake pressure is not preferable such as a time of driving, a time of steady running and the like.

SUMMARY OF THE INVENTION

The present invention has been achieved by taking the facts mentioned above into consideration, and an object of the present invention is to provide a wheel condition estimating apparatus which can estimate a road surface condition equally in various running conditions such as braking, driving, steady running and the like, and which can always estimate with high precision a frictional characteristic which relates to ease of slipping between a tire and a road surface regardless of variations in a resonance frequency due to replacement of a tire or changes in air pressure of a tire, and which enables highly-accurate ABS control on the basis of the frictional characteristic.

In order to realize the aforementioned object, in accordance with a first aspect of a present invention, there is provided a wheel condition estimating apparatus for estimating a wheel condition in a wheel resonance system including a frictional characteristic between a tire and a road surface, comprising: detecting means for detecting an output response with respect to a vibration input to the wheel resonance system; and estimating means for expressing a transfer characteristic of the wheel resonance system from the vibration input to the output response by a vibration model including, at least a physical quantity relating to ease of a slipping between the tire and the road surface as an unknown component of a wheel condition, and for estimating at least the unknown component which substantially satisfies the output response detected by the detecting means on the basis of the vibration model.

Further, in accordance with a second aspect of the present invention, the wheel condition estimating apparatus of the first aspect further comprises modifying means for modifying the vibration model on the basis of the output response detected by the detecting means.

Still further, in accordance with a third aspect of the present invention, in the wheel condition estimating apparatus of the first aspect or the second aspect, the vibration model further includes, a physical quantity relating to a constant of a torsion spring of the tire as an unknown component of the wheel condition.

Furthermore, in accordance with a fourth aspect of the present invention, the wheel condition estimating apparatus of any of the first aspect to the third aspect further comprises vibrating means for applying a vibration input to the wheel resonance system.

Moreover, in accordance with a fifth aspect of the present invention, the wheel condition estimating apparatus of the fourth aspect further comprises vibration input detecting means for detecting the vibration input applied to the wheel resonance system by the vibrating means.

Further, in accordance with a sixth aspect of the present invention, the wheel condition estimating apparatus of any of the first to the fifth aspects further comprises calculating means for calculating a determining value for determining whether or not the output response detected by the detecting means is a periodical output on the basis of the output response, and selecting means for selecting the output to be delivered to the estimating means among the output responses detected by the detecting means on the basis of the determining value calculated by the calculating means, wherein the estimating means uses the output selected by the selecting means at a time of estimating the unknown component.

Still further, in accordance with a seventh aspect of the present invention, in the wheel condition estimating apparatus of the sixth aspect, the calculating means calculates a correlation coefficient between the output response detected by the detecting means and a converted value obtained by converting the output response such that the periodical portion of the output response changes in correspondence to the change of the output response, as the determining value.

(Principles of the Present Invention)

Principles of the present invention will be described below with reference to FIGS. 1 to 3. Here, FIG. 1 shows an equivalent dynamic model of a wheel resonance system, FIG. 2 shows a frictional characteristic between a tire and a road surface, which defines a transfer characteristic of the wheel resonance system shown in FIG. 1, and FIG. 3 shows an example of a vibration model from a vibration input to an output response in the transfer characteristic of the wheel resonance system shown in FIG. 1.

First, as shown in FIG. 1, a vibration phenomenon in a wheel when a vehicle runs at a vehicle speed V (an angular velocity xv), that is, a vibration phenomenon of a wheel resonance system formed by at least a wheel and a road surface, is considered by referring to a dynamic model which is obtained by equivalent modeling by using a wheel rotational axis. The various quantities shown in FIG. 1 are as follows.

$J_1$: moment of inertia at rim $J_2$: moment of inertia at belt

K: constant of torsion spring of tire $T_1$: braking and driving torque (driving torque is positive, braking torque is negative)

$\omega_1$: angular velocity at rim $\omega_2$: angular velocity at belt $\theta_s$: torsion angle between rim and belt $T_d$: disturbance from road surface $T_L$: force generated between tire and road surface In the dynamic model of a wheel resonance system in FIG. 1, the brake and drive torque $T_1$ applied to the rim is transmitted to the belt through the torsion spring constant K of the tire, and is applied to the road surface through the belt surface. At this time, the generated force $T_L$ serving as the reaction of the brake and drive torque $T_1$ is applied to the wheel from the road surface, with a contact point between the belt and the road surface being a reference point.

This generated force $T_L$ is caused by the frictional force between the tire and the road surface, and acts in a direction opposite to the direction of the brake and drive torque $T_1$. Accordingly, the generated force $T_L$ acts in a direction opposite to the rotational direction of the wheel (the direction of w) in the case that the drive torque $T_1$ is applied to the rim at a time of driving, and the generated force $T_L$ acts in the rotational direction of the wheel in the case that the braking torque $T_1$ is applied at a time of braking. Further, if the road surface is uneven, a torque of a road surface disturbance $\Delta T_d$ generated by the unevenness also acts on the tire.

In this case, when the brake is applied at a time when the vehicle runs at a certain speed V (the value when converted into a rotation system is $\omega_v$), a slip is generated between the tire and the road surface. However, the generated force $T_L$ generated between the tire and the road surface at this time changes like the functional relation shown in FIG. 2 with respect to the slip ratio $S_1$ expressed by the following formula (the slip ratio is in a positive area).

$$S_1 = \frac{\omega_v - \omega_2}{\omega_v} \tag{1-1}$$

Similarly, also in the case that the driver steps on the acceleration pedal so as to accelerate at a time when the vehicle runs at a certain speed V, a slip is generated between the tire and the road surface. However, the generated force $T_L$ at this time changes like the functional relation shown in FIG. 2 with respect to a Slip ratio $S_2$ expressed by the following formula.

$$S_2 = \frac{\omega_2 - \omega_v}{\omega_2} \tag{1-2}$$

In this case, when the rotational direction of the wheel is the forward direction, the generated force $T_L$ between the tire and the road surface can be expressed by the following formulae.

At the time of braking:

$$T_L = WR\mu(S_1) \tag{2}$$

At the time of driving:

$$T_L = -WR\mu(S_2) \tag{3}$$

Here, W is the wheel load, R is the radius of the dynamic load of the tire, and $\mu$ is the coefficient of friction between the tire and the road surface. In this case, $\mu$ is expressed as a function of the slip ratio $S_1$ or $S_2$.

As shown by the S-$\mu$ curve in FIG. 2, it can be understood that a relation is established in which the generated force $T_L$ is 0 when the Slip ratio is 0, the generated force $T_L$ at the time of braking has a positive peak value at a certain positive Slip ratio, and the generated force $T_L$ at the time of driving has a negative peak value at a certain negative Slip ratio. Further, at various points of operation, the gradient of the generated force with respect to the slip ratio becomes a characteristic value, for example, a value near 0 at a time of the peak value. Therefore, the ease of slipping between the tire and the road surface can be expressed by using the gradient.

When the brake and drive torque applied to the rim is vibrated around the average brake and drive torque $T_1$ by an amplitude $\Delta T_1$ in the dynamic model in FIG. 1, the vibration torque component is present as the vibration component $\Delta \omega_1$ around the wheel speed $\omega_1$. Further, in the case that the vibration component $\Delta T_d$ is present in the road surface disturbance $T_d$, the vibration component generated by the disturbance is also added to the vibration component $\Delta \omega_1$ of the wheel speed.

When the transfer characteristic of the wheel resonance system in FIG. 1 is expressed by the vibration model in the various points of operation in FIG. 2, the following formula can be established.

$$\Delta \omega_1 = H_1(s)\Delta T_1 + H_2(s)\Delta T_d \tag{4}$$

Here, the following formulae can be established.

$$H_1(s) = \frac{J_2 s^2 + D_0 s + K}{J_1 J_2 s^3 + J_1 D_0 s^2 + K(J_1 + J_2)s + KD_0} \tag{5}$$

$$H_2(s) = \frac{K}{J_1 J_2 s^3 + J_1 D_0 s^2 + K(J_1 + J_2)s + KD_0} \tag{6}$$

Here, s denotes a Laplace operator.

Further, $D_0$ is expressed by $D_{10}$ and $D_{20}$ in the following formulae, in accordance with the time of braking and the time of driving, respectively.

$$\left(D_{10} = WR\frac{\partial \mu}{\partial s_1}\bigg|_{S_1=S_{10}}\right)\frac{1}{\omega_{v0}} \tag{7}$$

$$\left(D_{20} = WR(1-S_{20})^2 \frac{\partial \mu}{\partial S_2}\bigg|_{S_2=S_{20}} \frac{1}{\omega_{v0}}\right) \quad (8)$$

$S_{10}$ and $S_{20}$ represent Slip ratios at a certain point of operation at a time of braking and at a time of driving, respectively, and $\omega_{v0}$ denotes a vehicle speed at that point of operation.

In accordance with formula (7), $D_{10}$ is proportional to the wheel load w and to the Gradient $(\partial \mu/\partial S_1)$ of the S-$\mu$ curve at the Slip ratio $S_{10}$ at the point of operation, and is inversely proportional to the vehicle speed $\omega_{v0}$ at the point of operation. Further, when $S_{20}$ is near 0, the same also holds for $D_{20}$.

It is supposed that $\mu$ depends upon the Slip ratio in the above description. However, in the case that $\mu$ depends upon the slip speed, the following formulae can be established by redefining $S_1 = \omega_v - \omega_2$ and $S_2 = \omega_2 - \omega_v$.

$$\left(D_{10} = WR \frac{\partial \mu}{\partial s_1}\bigg|_{S_1=S_{10}}\right) \quad (9)$$

$$\left(D_{20} = WR \frac{\partial \mu}{\partial s_2}\bigg|_{S_2=S_{20}}\right) \quad (10)$$

In this case, $D_{10}$ and $D_{20}$ are proportional to the wheel load W and to the Gradient of the S-$\mu$ curve at the Slip ratios $S_{10}$ and $S_{20}$ at the operating point.

Since the above-described vibration model expresses the operation at an arbitrary point of operation, it also describes a special case of steady running in which neither braking and nor driving is performed. In the steady running, the point of operation becomes an origin of the S-$\mu$ curve, and $D_0 = D_{10} = D_{20}$ expresses the $\mu$ Gradient at the origin.

Further, the above-described vibration model is expressed by a third-degree system with respect to a Laplace operator s. However, in order to describe the physical phenomenon of vibration, a second-degree system is sufficient. When the third-degree model is approximated to the second-degree model, the following formulae can be obtained.

$$H_1(s) = \frac{J_2 s^2 + D_0 s + K}{J_1 D_0 s^2 + K(J_1 + J_2)s + KD_0} \quad (11)$$

$$H_2(s) = \frac{K}{J_1 D_0 s^2 + K(J_1 + J_2)s + KD_0} \quad (12)$$

It can thus be understood that the above-described vibration model expresses a response of the wheel speed vibration ($\Delta \omega_1$) as the output response with respect to the vibration input torque ($\Delta T_1$) to the resonance system and the road surface vibration ($\Delta T_d$) generated to the wheel resonance system by the tire rotating on an uneven road surface, in the wheel resonance system including the frictional characteristic between the tire and the road surface. It can also be understood that the vibration model includes a physical quantity $D_0$ relating to the ease of slip between the tire and the road surface.

FIG. 3 illustrates the state of the transfer from the vibration input to the output response in the above-described vibration model.

The appropriateness of this vibration model can be shown by experimental results. FIGS. 4A and 4B show results obtained by conducting an experiment on the frequency characteristic from the vibration input to the wheel speed vibration at the time when, at a given constant vehicle speed, the vibration input is added to the brake pressure $P_m$ so as to effect braking, with respect to various values (0.98 [MPa] to 4.90 [MPa]) of the brake pressure $P_m$. FIG. 4A shows the frequency characteristic (amplitude characteristic) of the ratio of the wheel speed vibration with respect to the vibration amplitude of the brake pressure $P_m$ (resonance gain), and FIG. 4B shows the phase characteristic from the vibration of the brake pressure $P_m$ to the wheel speed vibration.

It can be understood from FIG. 4A that the peak value of the resonance gain near the resonance frequency (about 40 Hz) decreases as the brake pressure increases. Further, it can be understood from FIG. 4B that in the phase from the brake pressure to the wheel speed vibration, the phase characteristic in the case of setting a value near the resonance frequency to be a boundary differs greatly in accordance with the magnitude of the brake pressure $P_m$.

The slip ratio and the braking force are increased and thus the gradient of the S-$\mu$ curve is reduced by an increase in the brake pressure $P_m$. Therefore, the increase in $P_m$ and the decrease in the gradient $D_0$ of the S-$\mu$ curve have substantially the same physical meaning. Accordingly, even if $D_0$ is varied, it can be expected that results similar to those of FIGS. 4A and 4B can be obtained.

On the other hand, when the response characteristic of the wheel speed vibration with respect to the brake vibration input is calculated on the basis of the above-described vibration model of the present invention, the amplitude characteristic shown in FIG. 5A and the phase characteristic shown in FIG. 5B are obtained. It can be understood from FIG. 5A that when the Gradient $D_0$ of the S-$\mu$ curve is reduced at the resonance frequency (40 Hz), the resonance peak is reduced in the same manner as shown in FIG. 4A. Further, it can be understood from FIG. 5B that the phase characteristic in the case of setting a value near the resonance frequency to be a boundary differs greatly in accordance with the magnitude of the Gradient $D_0$, so that there is a characteristic similar to FIG. 4B. Accordingly, the vibration model of the present invention well expresses the transfer characteristic of an actual wheel resonance system.

Further, FIGS. 6A and 6B show frequency spectra of the wheel speed vibration of drive wheels (a right rear wheel and a left rear wheel) obtained at a time of actual running on an asphalt road (a dry road) and a dirt road, respectively.

It can be understood that in the case of an asphalt road (FIG. 6A), the resonance peak clearly appears. However, no resonance peak appears in the case of a dirt road (FIG. 6B) on which the tire runs in a state near racing (idle rotation) due to power slide and the like.

FIGS. 7A and 7B respectively show the amplitude characteristic and the phase characteristic of the wheel speed vibration with respect to the tire road surface vibration input on the basis of the vibration model of the present invention. It can also be understood from these drawings that since the resonance peak comes to disappear as the gradient $D_0$ of the S-$\mu$ curve decreases, the amplitude characteristic and the phase characteristic well coincide with the characteristics of the experimental results.

As described above, the present invention is structured so as to estimate the physical quantity $D_0$ relating to the ease of slipping between the tire and the road surface, on the basis of the vibration model which well expresses the actual transfer characteristic. Accordingly, on the basis of the above-described vibration model which includes, as the unknown component of the wheel condition, at least a physical amount relating to the ease of slipping between the tire and the road surface, the estimating means of the present invention estimates at least an unknown component which can substantially satisfy the output response detected by the detecting means.

Further, as in the third aspect, in the case that the vibration model further includes, as an unknown component of the wheel condition, a physical quantity relating to the torsion spring constant K of the tire, the torsion spring constant K of the tire and the physical quantity relating to the constant can be estimated by the estimating means. The resonance frequency of the wheel resonance system and the like may be used as the physical quantity relating to the torsion spring constant of the tire.

Next, the principles of estimation by the estimating means in accordance with the present invention will be described.

As shown in FIG. 3, in the case of expressing the vibration model of the present invention by a transfer function 1 and a transfer function 2, the estimation of the unknown component by the estimating means is equivalent to the identification of these transfer functions.

A z-transformation discrete model is often employed as a transfer function for identification. However, there are the following problems in the case of identifying a discrete time model.

(1) Since the identification accuracy of the discrete time model is dependent on the sampling period, many trials and errors are required for obtaining a suitable sampling period.

(2) After identifying by the discrete time model, it is necessary to inversely convert to a continuous time model in order to calculate the physical quantity forming the system. However, a higher function is required for the calculation, so that the calculating time and the calculating errors are increased. Further, the inverse conversion is not uniformly obtained.

Accordingly, the z-transformation discrete model is not suitable to a model for calculating the physical quantity corresponding to the ease of slipping on the road surface.

Therefore, in the present invention, a continuous time model is identified. In the identification of the continuous time model, there are none of the problems caused by the identification of the discrete time model, so that there is an advantage in that the physical quantity corresponding to the ease of slipping on the road surface can be directly calculated.

For example, in the case of identifying the transfer function of a second-degree (quadratic) continuous time model, the following transfer functions obtained by modifying formulas (11) and (12) may be used as transfer functions to be identified.

$$G_1(s) = \frac{b_0 s^2 + b_1 s + b_2}{s^2 + a_1 s + a_2} \quad (11\text{-}2)$$

$$G_2(s) = \frac{b_2}{s^2 + a_1 s + a_2} \quad (12\text{-}2)$$

At this time, as in the fourth aspect, in the case of giving the vibration torque $\Delta T_1$ as the vibration input to the wheel resonance system, $\Delta \omega_1 = \Delta G_1(s) \Delta T_1$ can be obtained by formula (4) when the road surface disturbance is ignored since the road surface disturbance is minute in comparison with the vibration torque.

For example, in the case of using a least square method, the unknown parameter can be estimated by applying the least square method to each of the data obtained by successively applying the detected $\Delta \omega_1$ to a formula which modifies the above formula with respect to the unknown parameter $[a_1 \ a_2]$ or $[a_1 \ a_2 \ b_0 \ b_1 \ b_2]$ in accordance with a linear function form.

In this case, as in the fifth aspect, in the case in which the vibration input detecting means can detect the vibration input $\Delta T_1$ applied to the wheel resonance system by the vibrating means, all of the unknown parameters $[a_1 \ a_2 \ b_0 \ b_1 \ b_2]$ can be estimated. In contrast, in the case of not detecting $\Delta T_1$, $[a_1 \ a_2]$ can be estimated.

In this way, in the case of applying the vibration input to the wheel resonance system, the unknown parameter can be accurately estimated even when the tire is running on a good road surface which is for the most part even.

In contrast, in a case in which the vibration torque $\Delta T_1$ is not applied, the unknown parameter can be estimated by applying the least square method to each of the data obtained by successively applying the detected $\Delta \omega_1$ to a formula, which is obtained by modifying the formula $\Delta \omega_2 = \Delta G_2(s) \Delta T_d$ obtained by the formula (4) in the case of $\Delta T_1 = 0$, to a linear function form with respect to the unknown parameter $[a_1 \ a_2]$. In this case, there is an advantage that the unknown parameter can be estimated even in the case that the vibration torque $\Delta T_1$ cannot be applied.

Any of various kinds of modified least square methods can be used for suppressing the identification error. The method of instrument variable, the enlarged least square method and the generalized least square method which have been conventionally known can be employed as the modified least square method.

The estimating means in accordance with the present invention can estimate, as the following formula (13), the physical quantity relating to the road surface $\mu$ gradient $D_0$ from the corresponding relation between the transfer functions (11) and (11-2) or the functions (12) and (12-2) of the vibration model by using the estimated parameters $a_1$ and $a_2$.

$$\frac{a_2}{a_1} = \frac{D_0}{J_1 + J_2} \quad (13)$$

The estimating means can estimate the physical quantity relating to the torsion spring constant of the tire as $a_2 = K/J_1$. Further, the estimating means can thereby estimate the resonance frequency of the wheel resonance system.

In this way, when the physical quantity related to the $\mu$ Gradient $D_0$ of the road surface can be calculated, it can be judged that the frictional characteristic between the tire and the road surface is in a saturated state when the physical quantity is small, so that the ease of slipping on the road surface can be judged immediately. Further, the $\mu$ Gradient $D_0$ can be calculated without presupposing that the torsion spring constant of the tire is known. Therefore, the physical quantity relating to the ease of slipping between the tire and the road surface can be accurately determined regardless of whether the resonance frequency is changed due to replacement of the tire or a change in the tire air pressure. Further, the air pressure of the tire can be judged on the basis of the estimated value of the physical quantity relating to the torsion spring constant of the tire.

Further, in accordance with the second aspect, the vibration model is modified on the basis of the detected output response. For example, in order to improve the identification accuracy, in the case that a pre-treating means having a frequency characteristic corresponding to the resonance frequency of the wheel resonance system is provided at a step before the transfer function of the vibration model, the parameter of the pre-treating means is properly changed together with calculation being carried out by the least square method on the basis of the detected output response. In this case, the parameter of the pre-treating means can be expressed by the parameter of the transfer function. The parameter of the transfer function can again be updated by the output response passing through the changed pre-treating means and the transfer function. In this way, since the frequency characteristic of the pre-treating means approaches the frequency characteristic which is appropriate to the resonance frequency corresponding to the change in the torsion spring constant of the tire, estimation can be performed with higher accuracy than that of a case in which the pre-treating parameter is fixed.

The calculating means in accordance with the sixth aspect of the present invention calculates the determining value for determining whether or not the output response is a periodical output on the basis of the output response detected by the detecting means. In this case, the calculating means may be structured such as to calculate the relational coefficient between the output response detected by the detecting means and a converted value obtained by converting the output response such that the periodical portion of the output response changes in correspondence to the change of the output response, as the determining value. In this case, the conversion mentioned above is performed by any of an even number of differentiation, an even number of difference, an even number of integration and an even number of summation.

In this case, even when the output response having an unexpectedly large magnitude is converted in the above manner, the converted value includes a lot of components except the periodical portions. Accordingly, since the value obtained by converting the unexpected output response in the manner mentioned above does not change in correspondence to the change of the output response, there is a small relationship between the unexpected output response and the value obtained by converting the output response in the manner mentioned above.

Further, the value obtained by converting the output in which the periodical change does not significantly appear in the manner mentioned above has a small number of components converted such as to change in correspondence to the change of the output response. Accordingly, there is a small relationship between the output in which the periodical change does not significantly appear and the value obtained by converting the output response in the manner mentioned above.

In this case, the calculating means may be structured such as to calculate the determining value mentioned above at every time when a predetermined number of (for example, one) output response is detected by the detecting means.

Then, the selecting means selects output responses to be inputted to the estimating means among the output responses detected by the detecting means on the basis of the determining value calculated by the calculating means.

Accordingly, the estimating means uses the outputs selected by the selecting means at a time of estimating the unknown component mentioned above.

As mentioned above, since the apparatus is structured such as to calculate the determining value for determining whether or not the output response is the periodical output, select output responses to be used for estimation among the detected output responses on the basis of the calculated determining value, and estimate the unknown component by using the selected outputs, the apparatus can estimate the unknown component mentioned above on the basis of the output response except the output response having an unexpectedly large magnitude and the output in which the periodical change does not significantly appear.

BRIEF DESCRIPTION OF THE DRAWINGS

FIG. 3 is a schematic diagram of a vibration model in accordance with the present invention.

FIGS. 4A and 4B are diagrams which show results of an experiment on a frequency characteristic in a wheel resonance system at a time of actually variously changing a brake pressure $P_m$, wherein FIG. 4A shows an amplitude characteristic and FIG. 4B shows a phase characteristic.

FIGS. 5A and 5B are diagrams which show frequency characteristics of the vibration model in accordance with the present invention respectively calculated at times of variously changing a physical quantity $D_0$ relating to ease of slipping between a tire and a road surface in the vibration model, wherein FIG. 5A shows an amplitude characteristic and FIG. 5B shows a phase characteristic.

FIGS. 7A and 7B are diagrams which show frequency characteristics of the vibration model in accordance with the present invention respectively calculated at times of variously changing a physical quantity $D_0$ relating to ease of slip between a tire and a road surface in the vibration model, wherein FIG. 7A shows an amplitude characteristic and FIG. 7B shows a phase characteristic.

FIGS. 14A to 14C are graphs which show a vibration input waveform of a vibration input means in accordance with the third embodiment, wherein FIG. 14A shows a pseudo random waveform, FIG. 14B shows a waveform in a stepping manner, and FIG. 14C shows a waveform in an impulse manner.

FIGS. 24A and 24B are graphs which show a wheel speed signal of relatively low periodicity, and FIGS. 24C and 24D are graphs which show a wheel speed signal of relatively high periodicity, wherein FIGS. 24A and 24C relate to a front right wheel speed signal and FIGS. 24B and 24D relate to a front left wheel speed signal.

DESCRIPTION OF THE PREFERRED EMBODIMENTS

Embodiments of a wheel condition estimating apparatus in accordance with the present invention will be described below in detail with reference to the drawings.

(First Embodiment)

A wheel condition estimating apparatus in accordance with a first embodiment is structured such as to calculate a $\mu$ gradient in the case that only a road surface disturbance $\Delta T_d$ is input to a wheel resonance system as a vibration input, and includes a first aspect and a second aspect.

Figure 1:
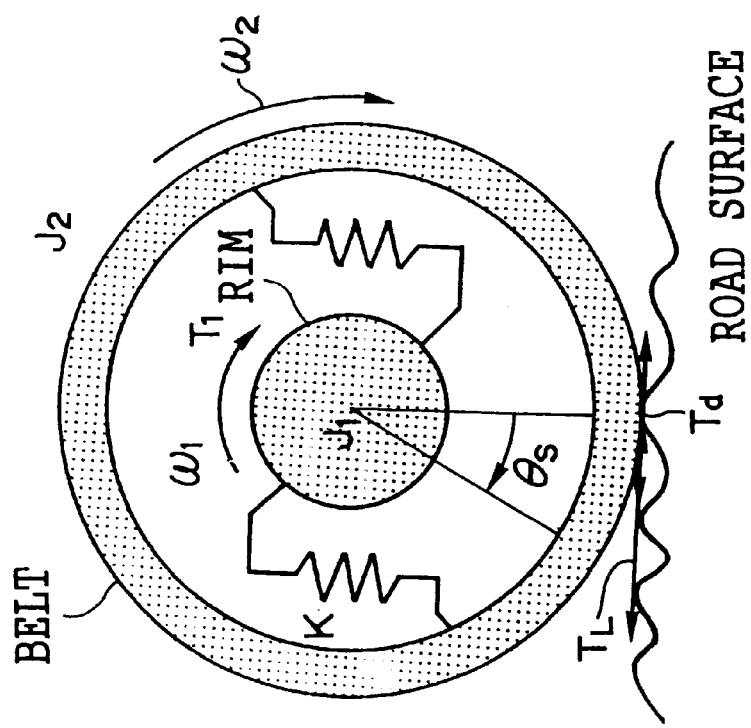
FIG. 1 is a schematic diagram which shows a dynamic model equivalent to a wheel resonance system in accordance with the present invention.
Figure 2:
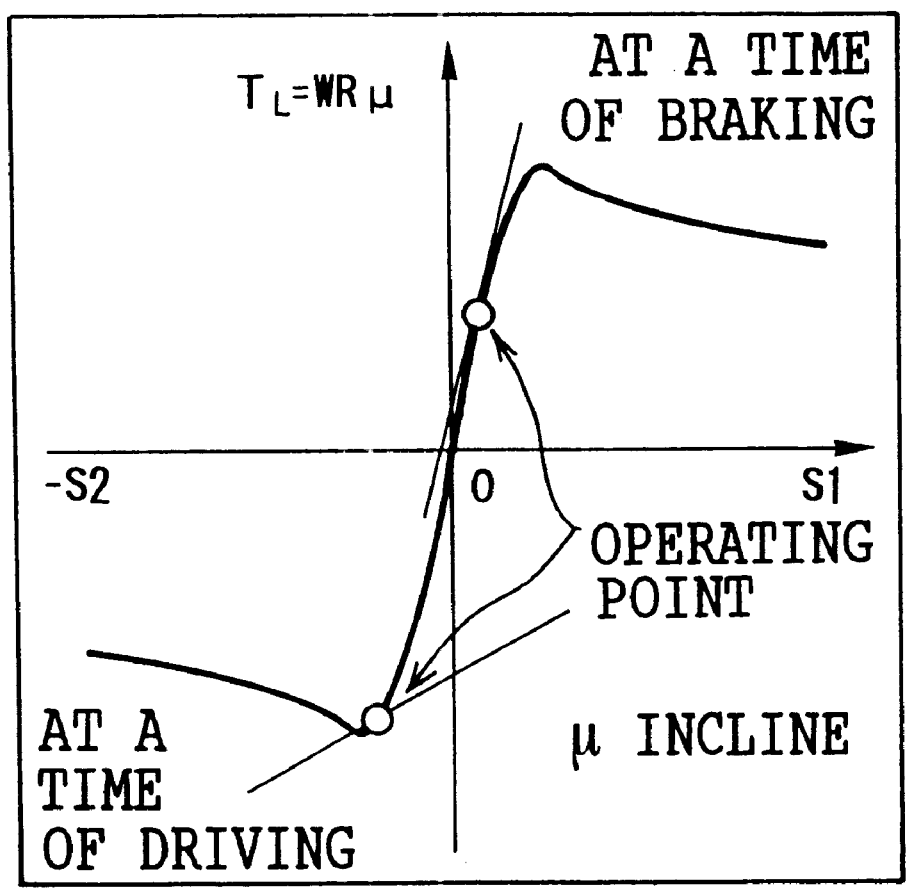
FIG. 2 is a diagram which shows a frictional characteristic between a tire and a road surface in a wheel resonance system in accordance with the present invention.
Figure 4A:
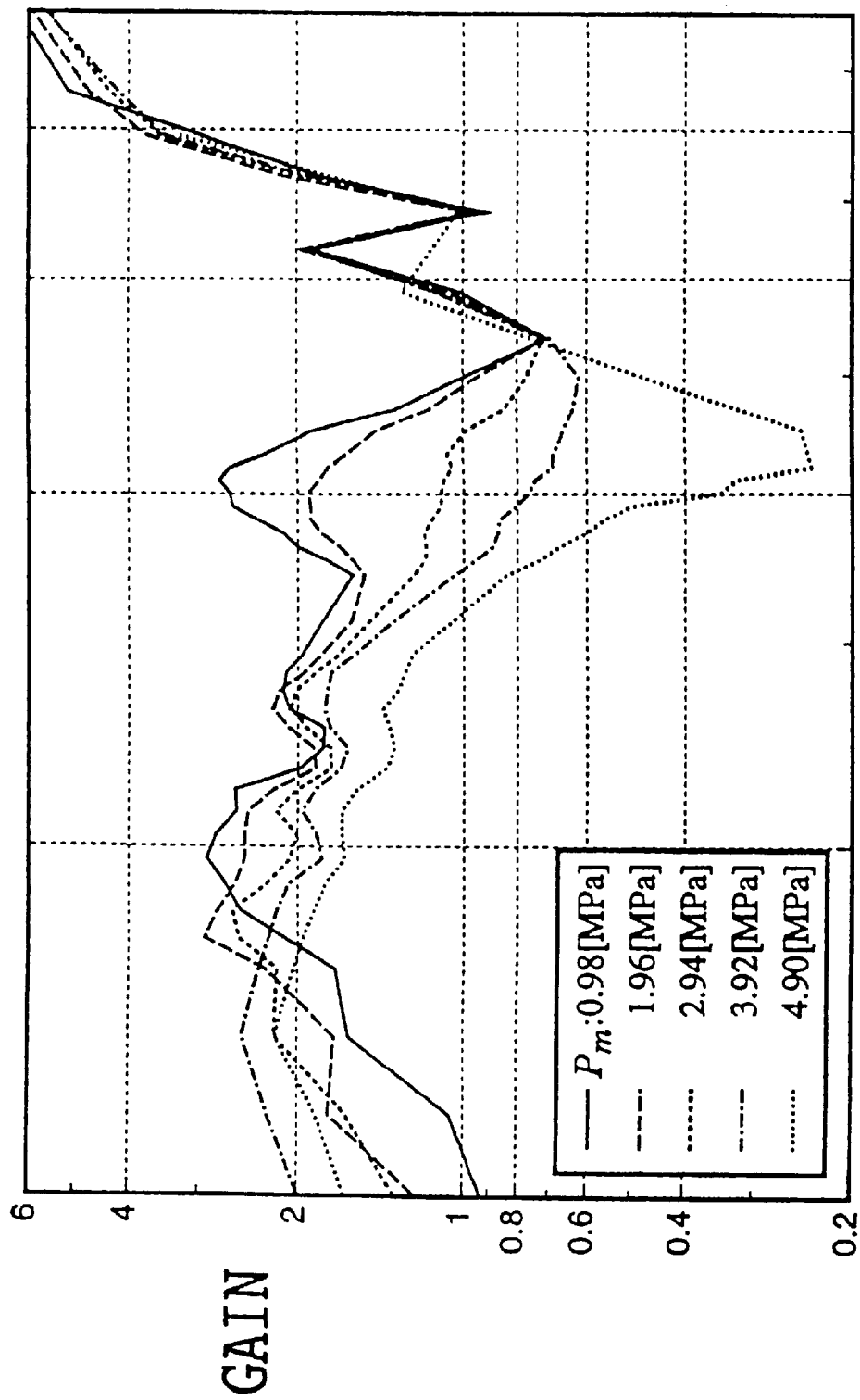
Figure 4B:
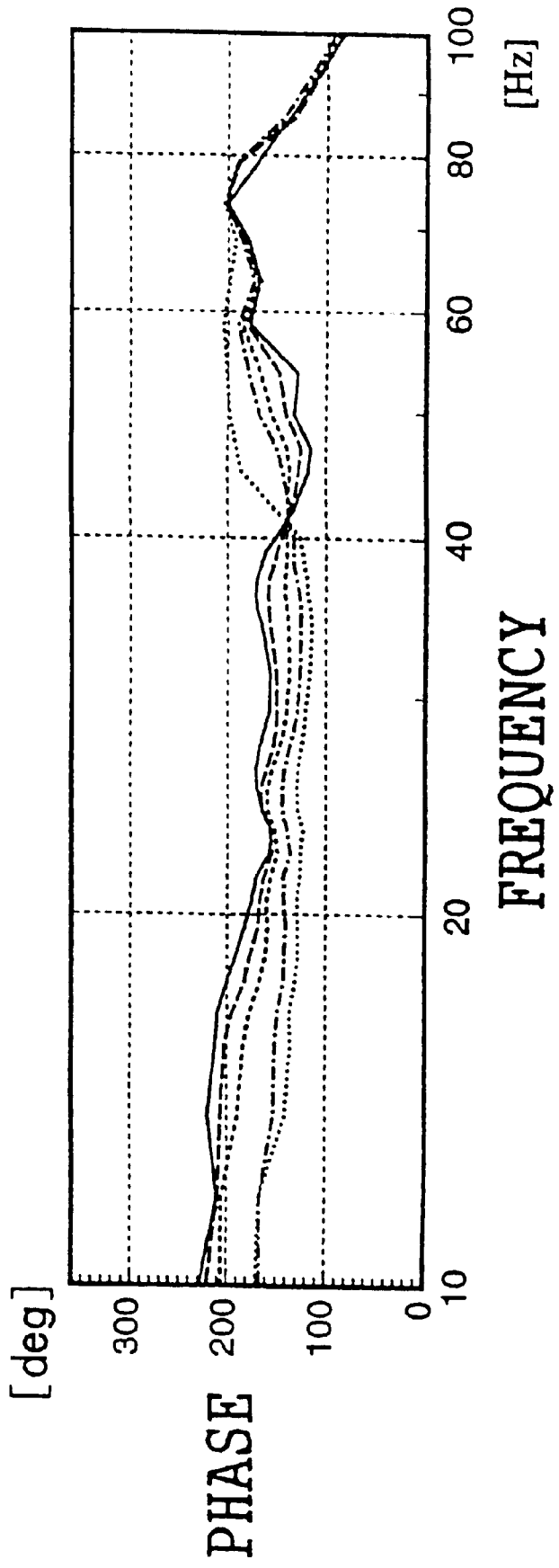
Figure 5A:
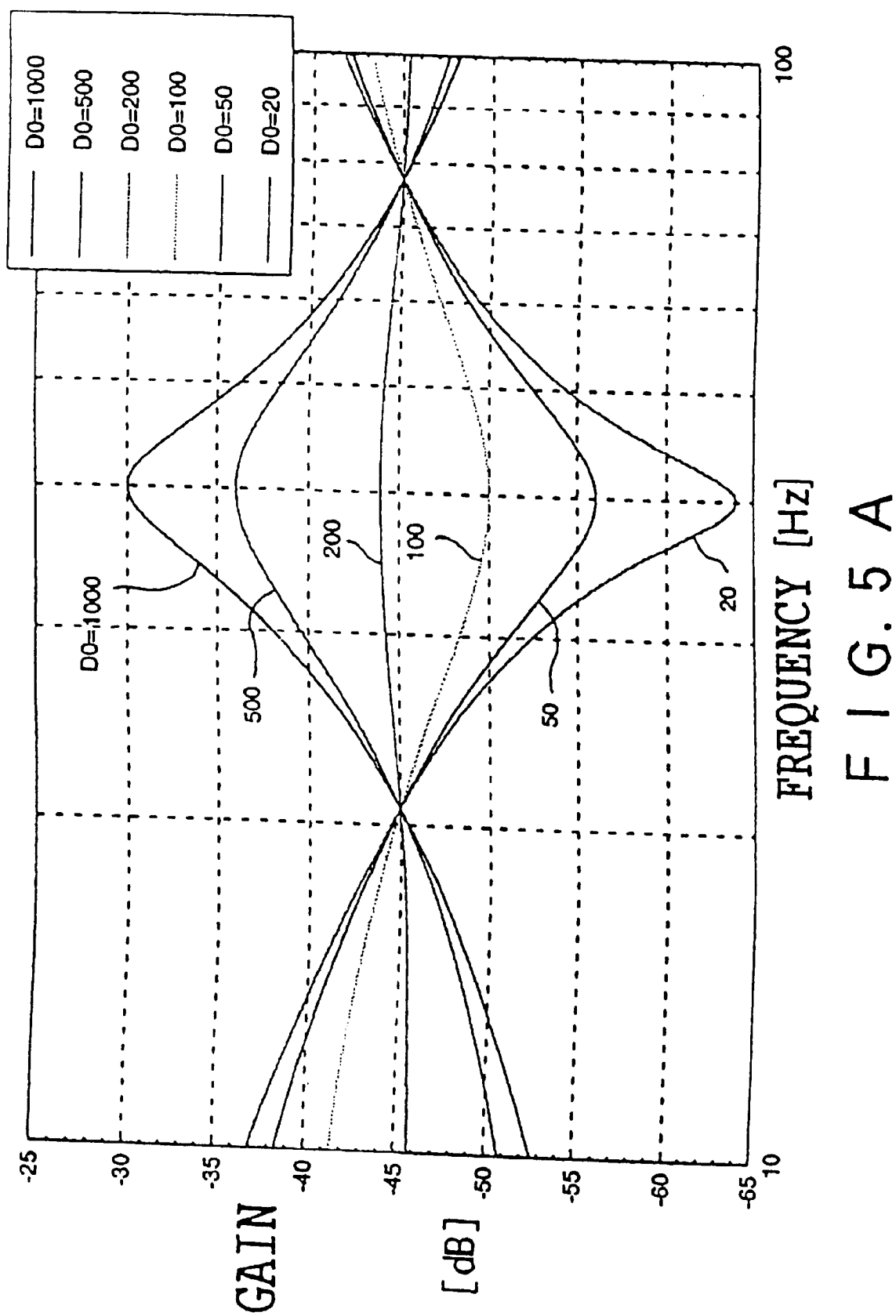
Figure 6A:
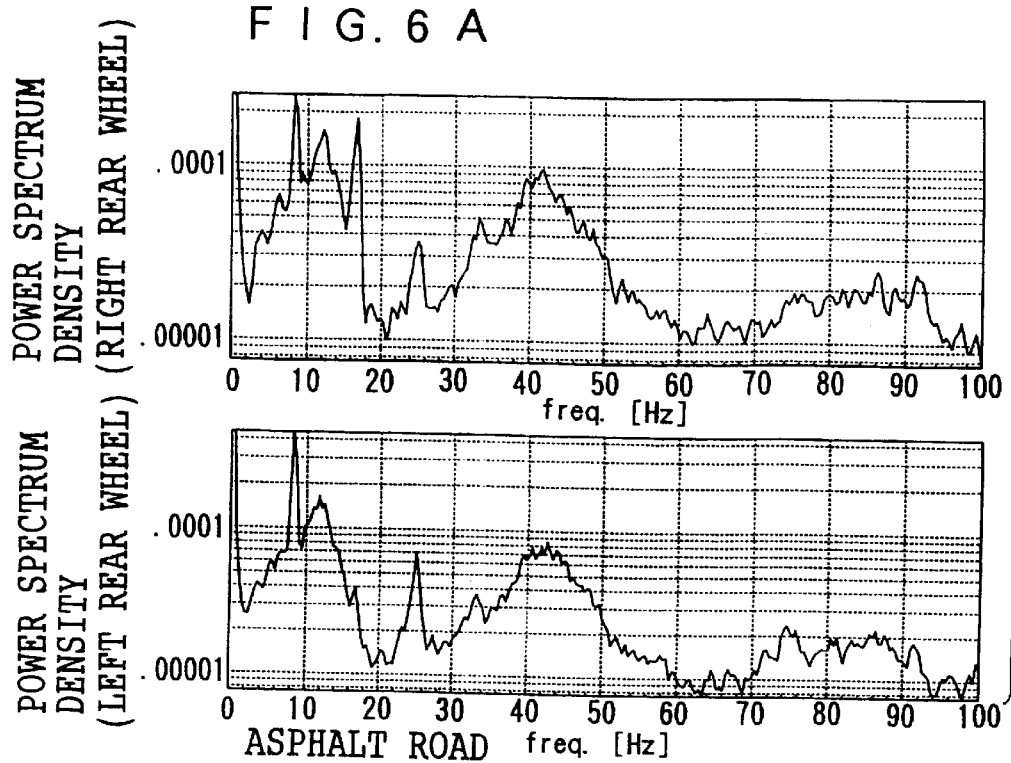
FIGS. 6A and 6B are diagrams which show results of analyzing a frequency of a wheel speed signal actually detected in a drive wheel, wherein FIG. 6A relates to an asphalt road and FIG. 6B relates to a dirt road.
Figure 6B:
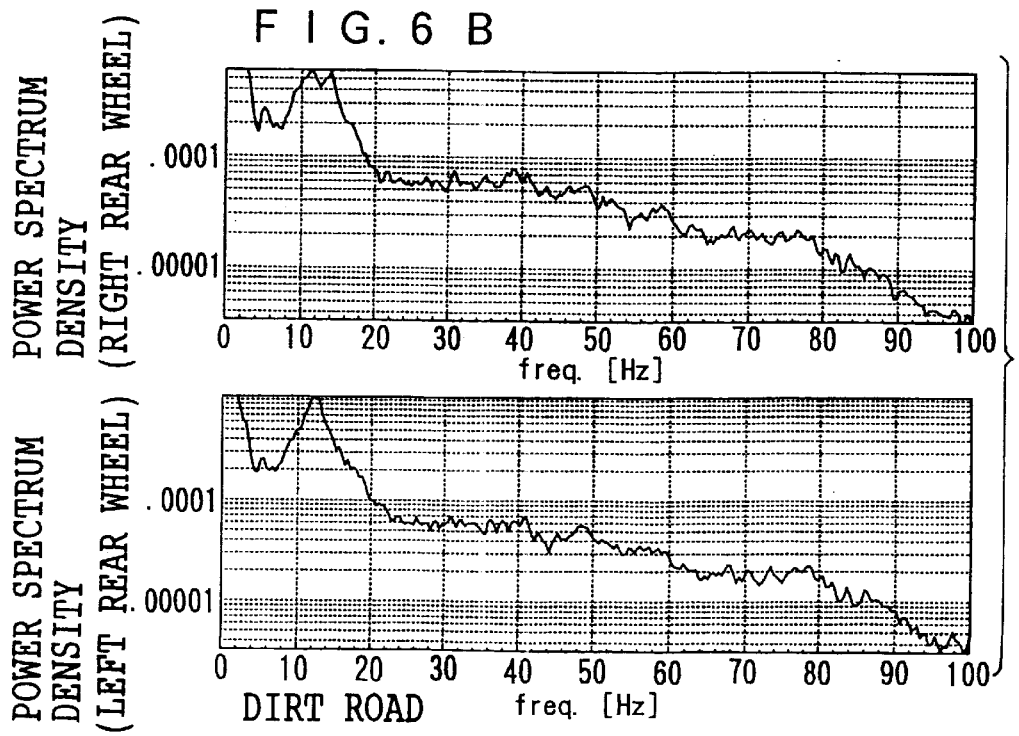
Figure 8:
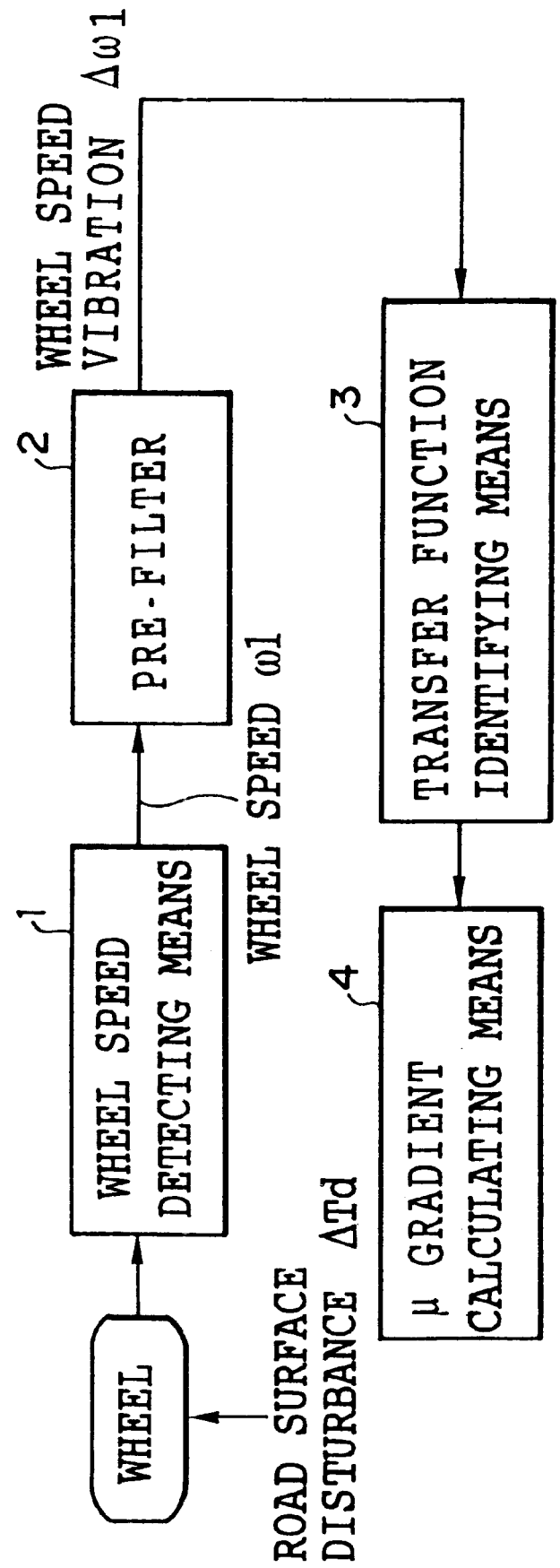
FIG. 8 is a block diagram which shows a structure of a first aspect relating to a first embodiment.

A structure of a first aspect of the wheel condition estimating apparatus in accordance with the first embodiment is shown in FIG. 8. As shown in the same drawing, this wheel condition estimating apparatus is constituted by wheel speed detecting means 1 for detecting a wheel speed $\omega_1$ of each of the wheels, a pre-filter 2 for detecting a wheel speed vibration $\Delta\omega_1$ of each of the wheels, as an output response of a wheel resonance system receiving a road surface disturbance $\Delta T_d$, from the detected wheel speed $\omega_1$ of each of the wheels, transfer function identifying means 3 for identifying the transfer function of each of the wheels which satisfies the detected wheel speed vibration $\Delta\omega_1$ by using a least square method on the basis of the vibration model shown in FIG. 3, and $\mu$ gradient calculating means 4 for calculating a gradient of a coefficient of friction $\mu$ between the tire and the road surface on the basis of the identified transfer function.

In FIG. 8, the wheel speed detecting means 1 can be constituted by a so-called wheel speed sensor which outputs a sensor output signal in accordance with a wheel speed, and calculating means for calculating an actual rotational speed signal of each of the wheels from the sensor output signal.

Further, the pre-filter 2 can be constituted by a band pass filter for passing only a frequency component at a fixed band area around a frequency expected as a resonance frequency of the present wheel resonance system, a high pass filter for passing only a frequency component at a high band area including the resonance frequency component, or the like. In this case, in accordance with the first aspect, the parameter for defining the frequency characteristic of the band pass filter or the high pass filter is fixed to a constant value, and in a second aspect mentioned below, the parameter is changed in such a manner as to correspond to the parameter identified by the transfer function identifying means 3.

In this case, an output of the pre-filter 2 is structured such as to remove a direct current component. Accordingly, only the wheel speed vibration $\Delta\omega_1$ around the wheel speed ah can be extracted.

Here, a transfer function F(s) of the pre-filter 2 is set to be as follows.

$$F(s) = \frac{1}{\sum_{i=0}^{m} c_i s^{m-i}} \tag{14}$$

Here, $c_i$ is a coefficient of the filter transfer function, and s is a Laplace operator.

Next, a calculating formula on which the transfer function identifying means 3 depends is introduced. In this case, in accordance with this embodiment, the operation is performed such that the calculation of the pre-filter 2 is included in the calculation of the transfer function identifying means 3.

At first, transfer function to be identified in the first embodiment is set to be a quadratic model with making the wheel speed vibration $\Delta\omega_1$ detected by the pre-filter 2 at this time an output response, in the case of setting the road surface disturbance $\Delta T_d$ to be the vibration input. Accordingly, the vibration model of the following formula is supposed.

$$\Delta\omega_1 = \frac{b_2}{\sum_{i=0}^{2} a_i s^{2-i}} \Delta T_d + v, a_0 = 1 \tag{15}$$

In the above formula, v is an observed noise contained at a time of observing the wheel speed signal. When the formula (15) is converted, the following formula can be obtained.

$$\sum_{i=0}^{2} a_i s^{2-i} \Delta\omega_1 = b_2 \Delta T_d + \sum_{i=0}^{2} a_i s^{2-i} v \tag{16}$$

At first, after applying the pre-filter of the (14) formula to the (16) formula, the obtained formula is made discrete. At this time, $\Delta\omega_1$, $\Delta T_d$ and v are expressed as the discrete data $\Delta\omega_1(k), \Delta T_d(k)$ and v(k) (in which k is a sampling number: k=1, 2, 3, . . . ) sampled at every sampling period $T_s$. Further, the Laplace operator s can be made discrete by using a predetermined discrete method. In this embodiment, the discrete is performed by the following bilinear transformation as an example. In this case, d is one sample delay operator.

$$s = \frac{2}{T_s} \frac{1-d}{1+d} \qquad 5$$

Further, since a dimension m of the pre-filter is desired to be two or more, in accordance with this embodiment, it is set that m=2 by taking a calculating time into consideration, so that the following formula can be obtained.

$$\sum_{i=0}^{2} a_i \xi_{yi}(k) = b_2 \xi_{u2}(k) + \sum_{i=0}^{2} a_i \xi_{vi}(k) \qquad (17)$$

wherein $$\xi_{yi}(k) = \left(\frac{T_s}{2}\right)^i (1+d)^i (1-d)^{2-i} F_0(d) \Delta\omega_1(k) \qquad (18)$$

$$\xi_{u2}(k) = \left(\frac{T_s}{2}\right)^2 (1+d)^2 F_0(d) \Delta T_d(k) \qquad (19)$$

$$\xi_{vi}(k) = \left(\frac{T_s}{2}\right)^i (1+d)^i (1-d)^{2-i} F_0(d) v(k) \qquad (20)$$

$$F_0(d) = \frac{1}{\sum_{i=0}^{2} c_i \left(\frac{T_s}{2}\right)^i (1+d)^i (1-d)^{2-i}} \qquad (21)$$

Still further, in order to identify the transfer function from each of the data of the wheel speed vibration $\Delta\omega_1$ on the basis of the least square method, the (17) formula is converted into the following formula in such a manner as to be a linear function type with respect to the parameter to be identified. In this case, "$T$" indicates a transposition of a matrix.

$$\xi_{y0}(k) = \zeta^T(k)\theta + r(k) \qquad (22)$$

wherein $$\zeta(k) = [-\xi_{y1}(k) - \xi_{y2}(k)]^T$$

$$\theta = [a_1 a_2]^T$$

$$r(k) = b_2 \xi_{u2}(k) + \sum_{i=0}^{2} a_i \xi_{vi}(k) \qquad (23)$$

In the above formula, $\theta$ is a parameter of a transfer function to be identified.

Next, an operation of this embodiment will be described below.

In the transfer function identifying means 3, the unknown parameter $\theta$ is estimated by applying the least square method to each of the data obtained by successively applying the discrete data of the detected wheel speed vibration $\Delta\omega_1$ to the formula (22), thereby identifying the transfer function.

Concretely speaking, the detected wheel speed vibration $\Delta\omega_1$ is converted into the discrete data $\Delta\omega(k)$ (k=1, 2, 3, . . . ), the data is sampled at N points and the calculating formula of the least square method shown by the following formula is used, so that the parameter $\theta$ of the transfer function is estimated.

$$\hat{\theta}(N) = \left[\sum_{k=1}^{N} \rho^{N-k} \zeta(k)\zeta^T(k)\right]^{-1} \left[\sum_{k=1}^{N} \rho^{N-k} \zeta(k)\xi_{y0}(k)\right] \qquad (24)$$

Here, an variable to which a cap "^" is added is defined to be an estimated value thereof.

Further, the least square method mentioned above may be calculated as a successive type least square method of calculating the parameter $\theta$ by the following recurrence formula.

$$\hat{\theta}(N) = \hat{\theta}(N-1) + h(N)\left[\xi_{y0}(N) - \zeta^T(N)\hat{\theta}(N-1)\right] \qquad (25)$$

$$h(N) = \frac{P(N-1)\zeta(N)}{\rho + \zeta^T(N)P(N-1)\zeta(N)} \qquad (26)$$

$$P(N) = \frac{1}{\rho}\{I - h(N)\zeta^T(N)\}P(N-1) \qquad (27)$$

In which $\rho$ is a so-called forgetting factor, and is normally set to be a value of 0.95 to 0.99. At this time, an initial value may be set to be the following formula.

$\hat{\theta}(-1)=0$, $P(-1)=\alpha I$, $\alpha$: sufficiently large positive number Further, as a method of reducing an estimating error in the least square method mentioned above, various kinds of modified least square methods may be employed. In this embodiment, an example of using the method of instrument variable corresponding to the least square method employing instrument variable will be described. In accordance with the method, with setting m(k) to be instrument variable at the stage of obtaining the relation of the (22) formula, the parameter of the transfer function is estimated by using the following formula.

$$\hat{\theta}(N) = \left[\sum_{k=1}^{N} \rho^{N-k} m(k)\zeta^T(k)\right]^{-1} \left[\sum_{k=1}^{N} \rho^{N-k} m(k)\xi_{y0}(k)\right] \qquad (28)$$

Still further, the successive calculation is shown as follows.

$$\hat{\theta}(N) = \hat{\theta}(N-1) + h(N)\left[\xi_{y0}(N) - \zeta^T(N)\hat{\theta}(N-1)\right] \qquad (29)$$

$$h(N) = \frac{P(N-1)m(N)}{\rho + \zeta^T(N)P(N-1)m(N)} \qquad (30)$$

$$P(N) = \frac{1}{\rho}\{I - h(N)\zeta^T(N)\}P(N-1) \qquad (31)$$

A principle of the method of instrument variable is described as follows. Since the (22) formula is given to the (28) formula, the following formula is obtained, $$\hat{\theta}(N) = \theta + \left[\sum_{k=1}^{N} \rho^{N-k} m(k)\zeta^T(k)\right]^{-1} \left[\sum_{k=1}^{N} \rho^{N-k} m(k)r(k)\right] \qquad (32)$$

the estimating value of $\theta$ coincides with a true value of $\theta$ when the observed value of concomitant variable is selected such that a second term of a right side in the (32) formula becomes zero. Then, in accordance with this embodiment, an observed value of concomitant variable delaying $\zeta(k) = [-\xi_{y1}(k) - \xi_{y2}(k)]^T$ at a degree of having no relation with respect to a formula error r(k), is employed as the observed value of concomitant variable. Accordingly, it is set to be $$m(k)=[-\xi_{y1}(k-L)-\xi_{y2}(k-L)]^T \quad (33).$$

In which L is a number of delay.

As mentioned above, after identifying the transfer function, in the $\mu$ gradient calculating means 4, the physical quantity in connection with the gradient $D_0$ of the road surface $\mu$ is calculated as follows.

$$\frac{\hat{a}_2}{\hat{a}_1} = \frac{D_0}{J_1 + J_2} \quad (34)$$

When the physical quantity in connection with the gradient $D_0$ of the road surface $\mu$ can be calculated by the (34) formula as mentioned above, for example, the frictional characteristic between the tire and the road surface can be easily diagnosed to be in a saturated state when the physical quantity is small.

Figure 9:
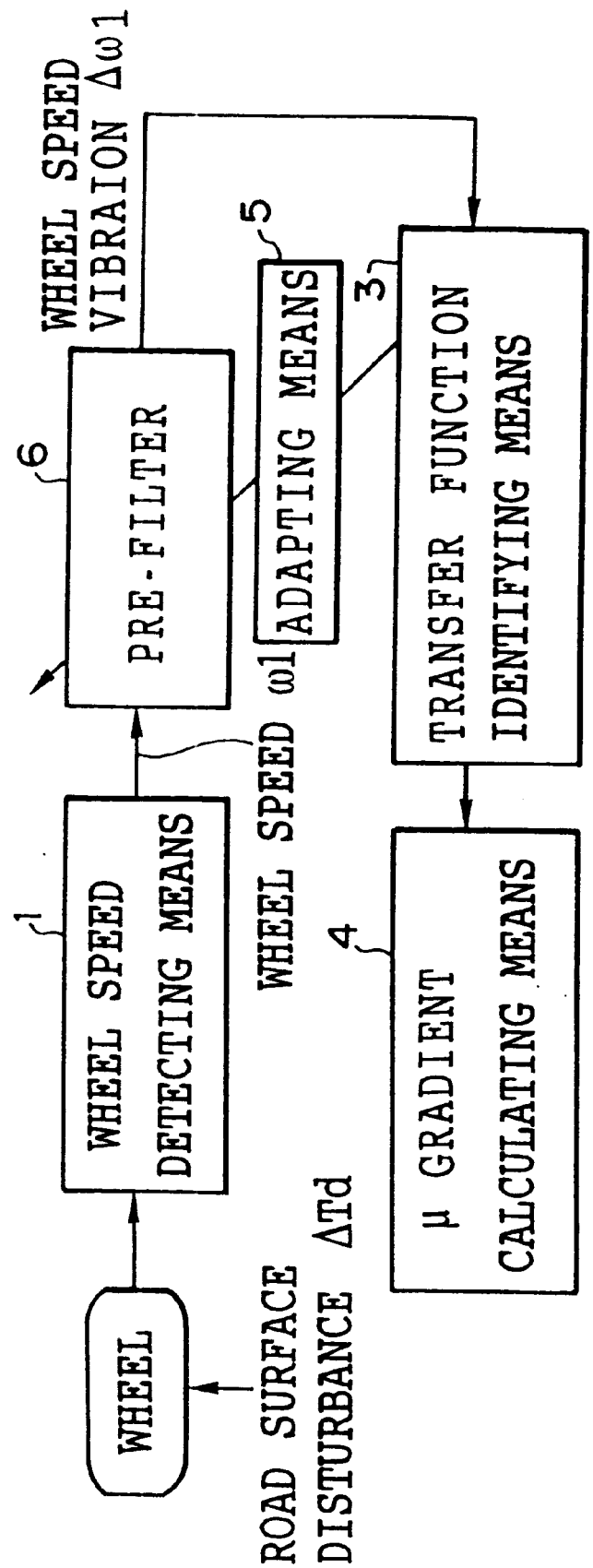
FIG. 9 is a block diagram which shows a structure of a second aspect relating to a first embodiment.

Next, a second aspect will be described below with reference to FIG. 9. As shown in FIG. 9, in accordance with the second aspect, adapting means 5 for changing the characteristic of the pre-filter 6 in accordance with the parameter identified by the transfer function identifying means 3 is further provided.

In the second aspect, it is desirable that the transfer function of the pre-filter 6 has the same characteristic as that of a polynomial expression in a denominator of the transfer function to be identified. However, since the transfer function to be identified is unknown, the transfer function of the pre-filter 6 is constituted by the following formula by using the parameter of the transfer function identified by the transfer function identifying means 3.

$$F(s) = \frac{1}{\sum_{i=0}^{2}(\hat{a}_i/\hat{a}_2)s^{2-i}} \quad (35)$$

In the transfer function identifying means 3 at that time, the following calculation is performed in the same manner as the successive type least square method in accordance with the first aspect.

$$\hat{\theta}(N) = \hat{\theta}(N-1) + h(N)\left[\xi_{y0}(N) - \zeta^T(N)\hat{\theta}(N-1)\right] \quad (36)$$

$$h(N) = \frac{P(N-1)\zeta(N)}{\rho + \zeta^T(N)P(N-1)\zeta(N)} \quad (37)$$

$$P(N) = \frac{1}{\rho}\{I - h(N)\zeta^T(N)\}P(N-1) \quad (38)$$

wherein $$\zeta(k) = ([-\xi_{y1}(k) - \xi_{y2}(k)])^T \quad (39)$$

$$\hat{\theta} = ([\hat{a}_1 \hat{a}_2])^T$$

$$\xi_{yi}(k) = \left(\frac{T_s}{2}\right)^i (1+d)^i (1-d)^{2-i} F_0(d)\Delta\omega_1(k) \quad (40)$$

$$F_0(d) = \frac{1}{\sum_{i=0}^{2}(\hat{a}_i/\hat{a}_2)\left(\frac{T_s}{2}\right)^i (1+d)^i (1-d)^{2-i}} \quad (41)$$

Then, in the adapting means 5, the coefficient of the transfer function of the (35) formula of the pre-filter 6 is constructed from each of the components $a_1$ and $a_2$ of the parameter $\theta$ of the estimated transfer function. Then, the transfer function identifying means 3 again estimates the parameter of the transfer function of the wheel resonance system from the wheel speed vibration w detected by the pre-filter 2 to which the coefficient is adapted.

In accordance with the second aspect, since the characteristic of the pre-filter is properly changed in correspondence to the estimated parameter, there is an effect that a better estimated value can be obtained in comparison with the first aspect in which the parameter of the pre-filter is fixed.

Figure 10:
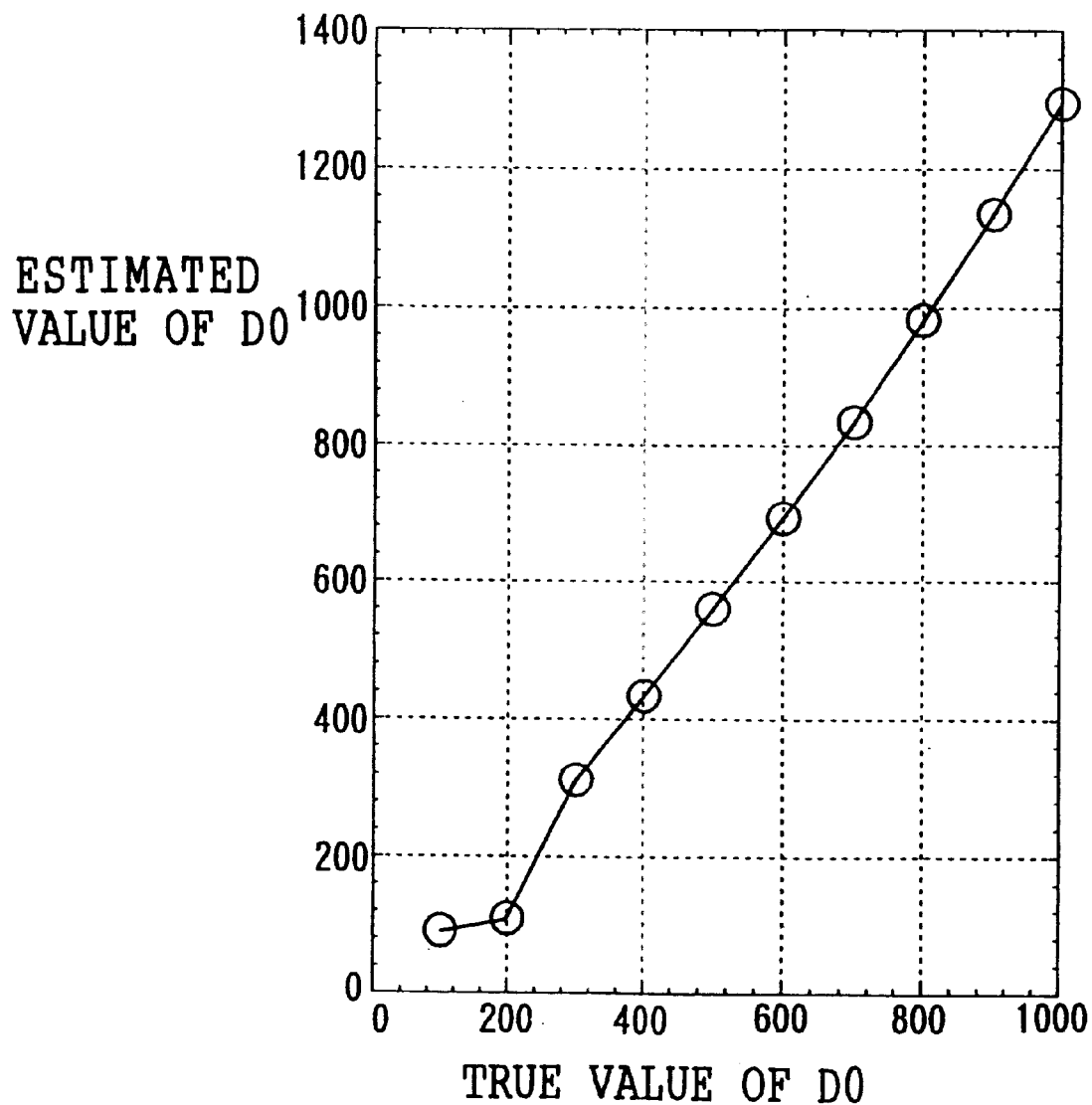
FIG. 10 is a graph which shows results of estimating a physical quantity $D_0$ relating to ease of slipping between a tire and a road surface, which results are estimated by a wheel condition estimating apparatus in accordance with a first embodiment.

An estimating result in the case of performing the second aspect is shown in FIG. 10. In the same drawing, a horizontal axis indicates a true value of the physical quantity $D_0$ in connection with the easiness of the slip between the tire and the road surface, and a vertical axis indicates an estimated value of $D_0$ in accordance with the second aspect. As shown in the drawing, it is understood that the physical quantity $D_0$ in connection with the easiness of the slip between the tire and the road surface is well estimated by the present aspect.

In the case of applying the present invention to the antilock brake control apparatus, the Braking force is controlled such that the estimated physical quantity $D_0$ coincides with the reference value. Since the physical quantity $D_0$ is calculated without premising that the resonance frequency is known, the antilock brake controlling operation can be accurately performed without relation whether or not the resonance frequency is changed by the replacement of the tire, the reduction of the tire air pressure or the like. Further, the same effect can be obtained also in the application to the traction control.

(Second Embodiment)

As is also understood from the (6) and (12) formulas, a constant K of the torsion spring of the tire is included in the vibration model in accordance with the present invention as the unknown component of the wheel state. With paying an attention to this point, in accordance with the second embodiment, in the same manner as the first embodiment, it is structured such as to estimate the physical quantity in connection with the torsion spring constant K of the tire from the transfer function of the vibration model in the case that only the road surface disturbance $\Delta T_d$ is input to the wheel resonance system as the vibration input.

The second embodiment will be described below with reference to a block diagram shown in FIG. 11. In this case, the same reference numerals are attached to the same components as those of the first embodiment, and a detailed explanation thereof will be omitted.

Figure 11:
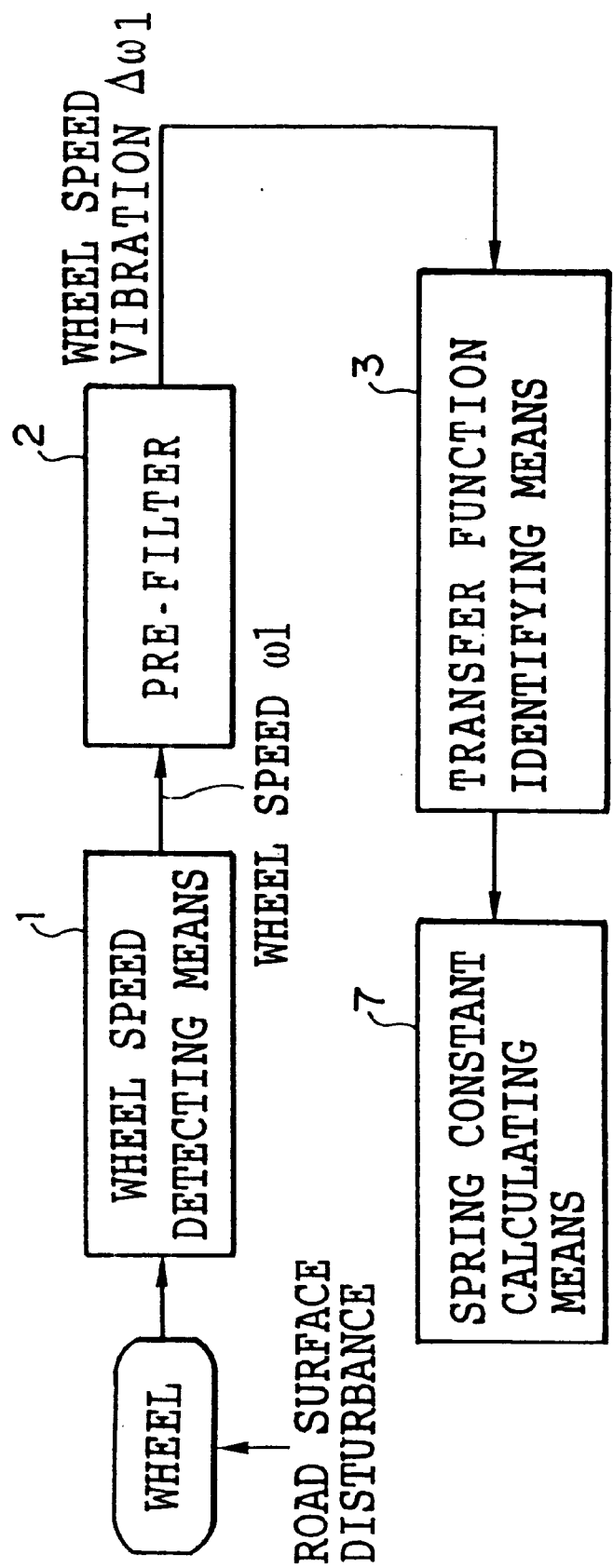
FIG. 11 is a block diagram which shows a structure of a second embodiment in accordance with the present invention.

As shown in FIG. 11, the second embodiment is structured such as to connect the spring constant calculating means 7 for calculating the physical quantity in connection with the torsion spring constant of the tire on the basis of the parameter identified by the transfer function identifying means 3 to the output end of the transfer function identifying means 3.

Next, a flow of the calculation by the spring constant calculating means 7 will be described below.

When the parameter of the transfer function is identified by the transfer function identifying means 3 shown in FIG. 11, the identified transfer function can be expressed by the following formula.

$$G(s) = \frac{b_2}{s^2 + \hat{a}_1 s + \hat{a}_2} \quad (42)$$

Accordingly, from the corresponding relation to the vibration model expressed by the (12) formula, the following formula can be obtained.

$$\hat{a}_2 = K/J_1 \quad (43)$$

Then, in the spring constant calculating means 7, in accordance with the (43) formula, the torsion spring constant K of the tire is calculated from the estimated value (^ is added) of the parameter $a_2$ identified by the transfer function identifying means 3 and the predetermined moment of inertia $J_1$ in the rim end.

Further, the following formula expresses the resonance frequency of the wheel resonance system.

$$\sqrt{\hat{a}_2} = \sqrt{K/J_1} \tag{44}$$

Then, in the spring constant calculating means 7, the resonance frequency of the wheel resonance system can also be calculated by the (44) formula as one of the physical quantities in connection with the torsion spring constant K of the tire.

Further, since the torsion spring constant K of the tire and the resonance frequency obtained by this embodiment are dependent on the tire air pressure, they can be used as the information for a tire air pressure judging apparatus, so that a safe running can be performed.

In accordance with this tire air pressure judging apparatus, for example, in the case that the estimated torsion spring constant K of the tire and the predetermined reference value are compared with each other and the constant is equal to or more than the reference value, it is judged that "tire air pressure is normal", and in the case that the constant is less than the reference value, it is judged that "tire air pressure is abnormal", thereby warming the driver. Further, it may be structured such that a second a reference value corresponding to the tire air pressure suitable for running on a high way is prepared, and in the case that the spring constant K is less than the second reference value, a warning of supplementing the tire air pressure is indicated to the driver. In this case, by preparing the reference values for various kinds of tires, the reference for judging the tire air pressure can be kept the same even at a time of replacing the tire.

Further, there is an advantage that the vibration frequency can be provided to the antilock brake control apparatus for controlling the braking force on the basis of the vibration of the Braking force. For example, even when the resonance frequency changes due to the change of the tire air pressure and the replacement of the tire, the resonance gain calculated in the same frictional state indicates substantially the same value by finely oscillating the Braking force by the changed resonance frequency, so that the detecting accuracy of the peak 9 can be maintained. Still further, in the antilock brake control apparatus for detecting a state immediately before the peak i by detecting the resonance frequency from the peak value of the frequency spectrum in the wheel speed signal and comparing the detected resonance frequency with the resonance frequency when the tire grips, a state immediately before the peak $\mu$ can be always detected in an accurate manner without relation to the change of the tire air pressure or the like by setting the resonance frequency estimated by this embodiment to be a reference for comparison.

In this case, in accordance with the second embodiment, the parameter of the pre-filter 2 is fixed. However, it may be structured such as to properly change the coefficient of the pre-filter 2 in accordance with the parameter of the estimated transfer function as in the second aspect of the first embodiment.

Figure 12:
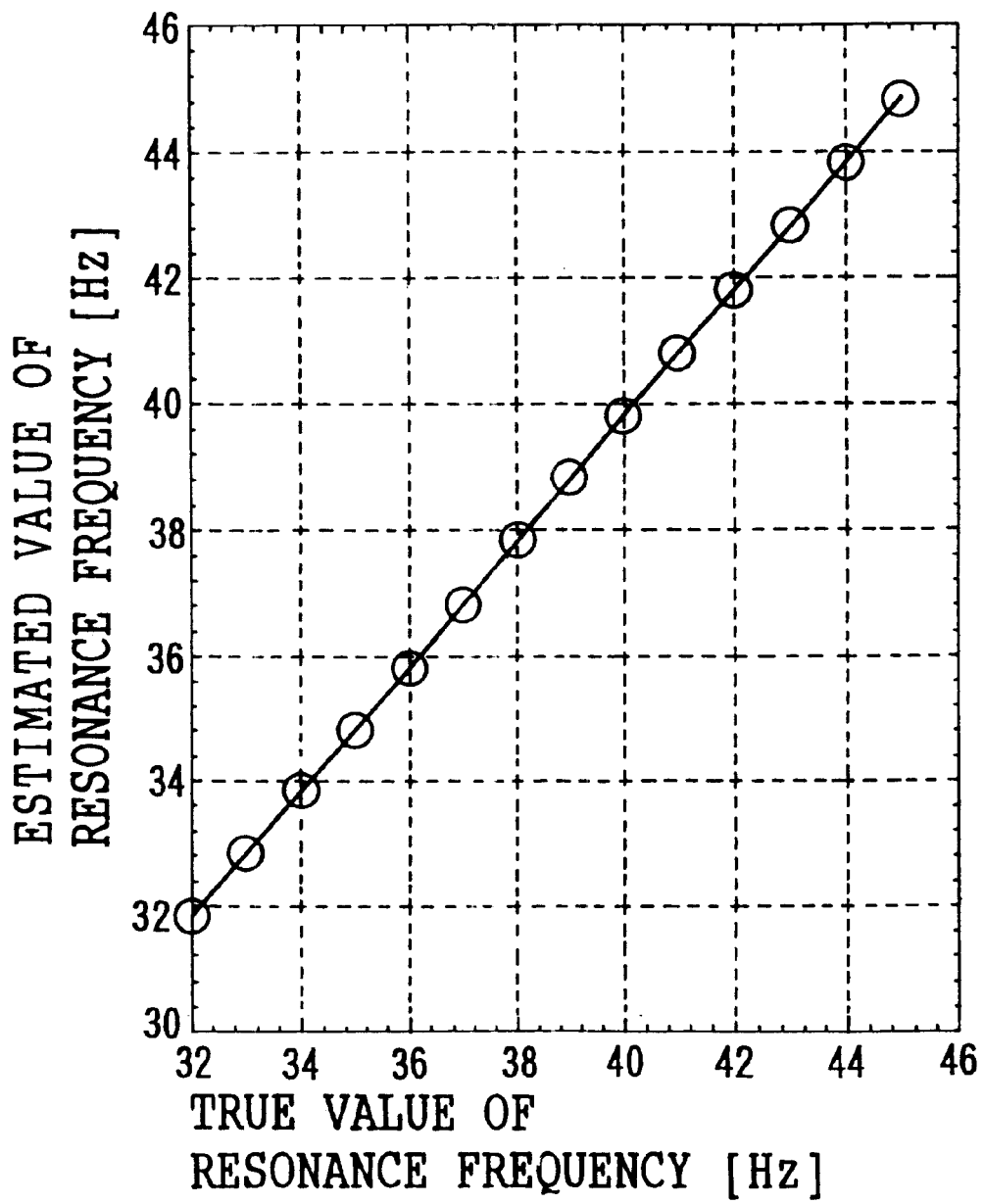
FIG. 12 is a graph which shows results of estimating a resonance frequency of a wheel resonance system, which results are estimated by a wheel condition estimating apparatus in accordance with the second embodiment.

An estimating result of the resonance frequency at a time of performing the second embodiment is shown in FIG. 12. In the drawing, a horizontal axis indicates a true value of the resonance frequency, and a vertical axis indicates the resonance frequency calculated by using the (44) formula in accordance with this embodiment. As shown in the drawing, it is understood that the resonance frequency can be significantly well estimated by this embodiment.

(Third Embodiment)

A wheel condition estimating apparatus in accordance with a third embodiment is structured such as to identify the transfer function of the wheel resonance system in the case that the vibration torque $\Delta T_1$ is input to the wheel resonance system as the vibration input, and has a first aspect for calculating the $\mu$ gradient and a second aspect for calculating the torsion spring constant of the tire.

Figure 13:
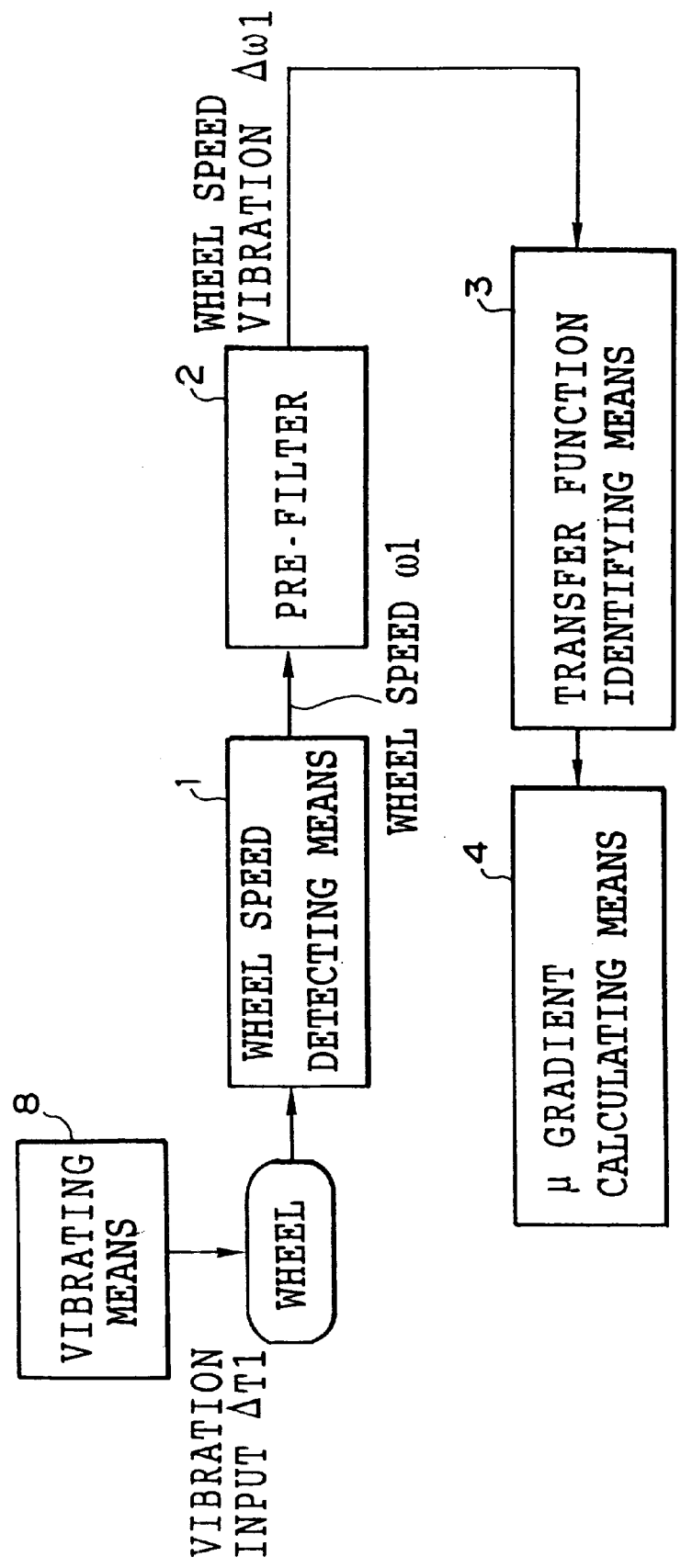
FIG. 13 is a block diagram which shows a structure of a first aspect relating to a third embodiment of the present invention.

A structure of a first aspect of the wheel condition estimating apparatus in accordance with the third embodiment is shown in FIG. 13. In this case, the same reference numerals are attached to the same components as those of the first embodiment shown in FIG. 8, and the detailed explanation will be omitted.

AS shown in FIG. 13, a vibrating means 8 for adding the vibration torque $\Delta T_1$ as the vibration input around the average brake and drive torque $T_1$ is further provided in the wheel condition estimating apparatus. The vibrating means 8 vibrates the wheel around the center axis thereof by vibrating the brake pressure and the engine output. For example, in the case of vibrating the Braking torque, the Braking torque can be vibrated by adding a pressure increase and decrease command having a predetermined frequency to an average brake pressure command in a control command of a pressure increase and decrease valve in a hydraulic actuator for a brake pressure.

Next, a calculation formula on which the transfer function identifying means 3 in accordance with this embodiment depends will be introduced. In this case, also in accordance with this embodiment, the calculation of the pre-filter 2 is performed in such a manner as to be included in the calculation of the transfer function identifying means 3.

At first, a quadratic model in which the transfer function to be identified in the third embodiment is made such that the vibration torque $\Delta T_1$ is a vibration input and the wheel speed vibration an detected by the pre-filter 2 at that time is an output response is prepared. Accordingly, the vibration model expressed by the following formula is supposed.

$$\Delta \omega_1 = \frac{\sum_{i=0}^{2} b_i s^{2-i}}{\sum_{i=0}^{2} a_i s^{2-i}} \Delta T_1 + v, \ a_0 = 1 \tag{45}$$

In which v is an observation noise included at a time of observing the wheel speed signal. The following formula is obtained by modifying the (45) formula.

$$\sum_{i=0}^{2} a_i s^{2-i} y(t) = \sum_{i=0}^{2} b_i s^{2-i} \Delta T_1 + \sum_{i=0}^{2} a_i s^{2-i} v(t) \tag{46}$$

At first, after applying the pre-filter of the (14) formula to the (46) formula, the obtained formula is made discrete. At this time, $\Delta \omega_1$, $\Delta T_d$ and v are expressed as the discrete data $\Delta \omega_1(k), \Delta T_d(k)$ and $v(k)$ (in which k is a sampling number: k=1, 2, 3, . . . ) sampled at every sampling period $T_s$. Further, the Laplace operator s can be made discrete by the bilinear transformation mentioned above using a delayed calculating component d.

Further, since a dimension m of the pre-filter is desired to be two or more, in accordance with this embodiment, it is set that m=2 by taking a calculating time into consideration, so that the following formula can be obtained.

$$\sum_{i=0}^{2} a_i \xi_{yi}(k) = \sum_{i=0}^{2} b_i \xi_{ui}(k) + \sum_{i=0}^{2} a_i \xi_{vi}(k) \quad (47)$$

wherein $$\xi_{yi}(k) = \left(\frac{T_s}{2}\right)^i (1+d)^i (1-d)^{2-i} F_0(d) \Delta \omega_1(k) \quad (48)$$

$$\xi_{ui}(k) = \left(\frac{T_s}{2}\right)^i (1+d)^i (1-d)^{2-i} F_0(d) \Delta T_1(k) \quad (49)$$

$$\xi_{vi}(k) = \left(\frac{T_s}{2}\right)^i (1+d)^i (1-d)^{2-i} F_0(d) v(k) \quad (50)$$

$$F_0(d) = \frac{1}{\sum_{i=0}^{n} c_i \left(\frac{T_s}{2}\right)^i (1+d)^i (1-d)^{2-i}} \quad (51)$$

Still further, in order to identify the transfer function from each of the discrete data of the wheel speed vibration $\Delta \omega_1$ on the basis of the least square method, the (47) formula is converted into the following formula in such a manner as to be a linear function type with respect to the parameter to be identified. In this case, "T" is set to be a transposition of a matrix.

$$\xi_{y0}(k) = \zeta^T(k)\theta + r(k) \quad (52)$$

wherein $$\zeta(k) = [-\xi_{y1}(k) - \xi_{y2}(k)]^T$$

$$\theta = [a_1 a_2]^T$$

$$r(k) = \sum_{i=0}^{2} b_i \xi_{ui}(k) + \sum_{i=0}^{2} a_i \xi_{vi}(k) \quad (53)$$

In the above formula, θ is a parameter of a transfer function to be identified.

Next, an operation of this embodiment will be described below.

In the transfer function identifying means 3, the unknown parameter θ is estimated by applying the least square method to each of the data obtained by successively applying the discrete data of the detected wheel speed vibration $\Delta \omega_1$ to the formula (52), thereby identifying the transfer function.

Concretely speaking, the detected wheel speed vibration $\Delta \omega_1$ is converted into the discrete data $\Delta \omega(k)$ (k=1, 2, 3, . . . ), and the data is sampled at a number of N points. Then, by using the above formulas $\zeta(k)$ and $\xi_{y0}(k)$, the estimated values (^ is added) of the parameters $a_1$ and $a_2$ of the transfer function are calculated in accordance with the same calculation as that of the (24) formula and thereafter in the first embodiment. In this case, in this embodiment, the successive type least square method and the method of observed value of concomitant variable may be employed, and as in the second aspect of the first embodiment, the coefficient of the pre-filter 2 may be properly changed in correspondence to the parameter of the identified transfer function.

Figure 14:
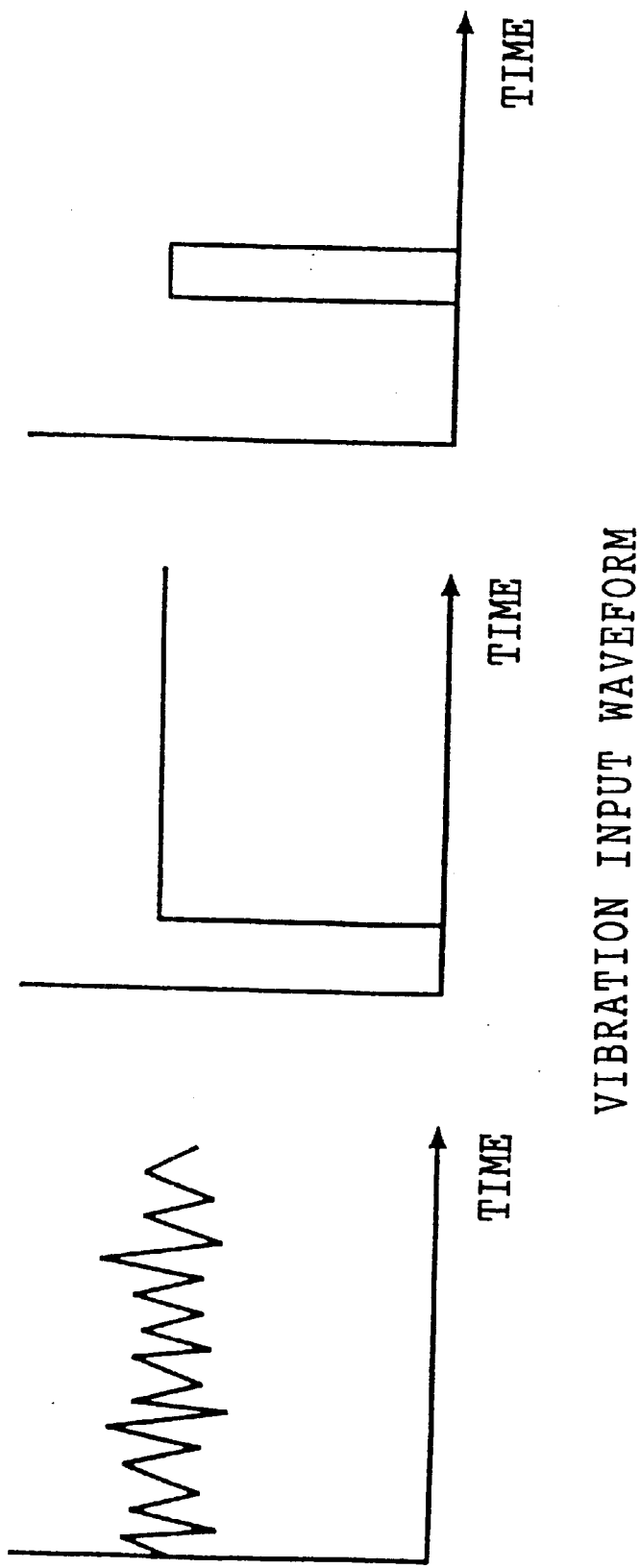

In this case, an example of the signal waveform of the vibration torque $\Delta T_1$ given by the vibrating means 8 will be shown in FIGS. 14A, 14B and 14C.

The signal in FIG. 14A is a pseudo random signal, which, for example, can be generated on the basis of an M group signal as is well known as one of the pseudo random signals. In this case, since the vibration input has a lot of frequency components, there is an advantage that an accuracy of estimating the transfer function is improved.

Further, the signal in FIG. 14B is a step signal which suddenly stands up at a certain time from a state in which the vibration torque is 0 and keeps a constant vibration torque thereafter. In the case of using the step signal, since it is not necessary to frequently change the torque as in the pseudo random signal, the vibration and the noise are reduced, so that there is an advantage that the load of the actuator is reduced.

Still further, the signal in FIG. 14C is an impulse signal which suddenly stands up at a certain time from a state in which the vibration torque is 0 and again returns to a state in which the vibration torque is 0 after a fixed time has passed. In the case of using the impulse signal, since there is no offset component in the torque and the signal can be immediately given in various running state such as the braking, the driving, the steady running and the like, the transfer function can be estimated in an optional running state.

Next, as a second aspect, a wheel condition estimating apparatus further comprising the physical quantity in connection with the torsion spring constant of the tire in the vibration model in accordance with the first aspect mentioned above will be described below.

As is understood from the formulas (5) and (11), in the vibration model of the present invention, the torsion spring constant K of the tire is included as an unknown component of the wheel condition. With paying attention to this point, in accordance with the second aspect, it is structured such as to estimate the physical quantity in connection with the torsion spring constant K of the tire from the transfer function of the vibration model in the case that the vibration torque $\Delta T_1$ is input to the wheel resonance system as the vibration input.

The second aspect will be described below with reference to a block diagram shown in FIG. 15.

Figure 15:
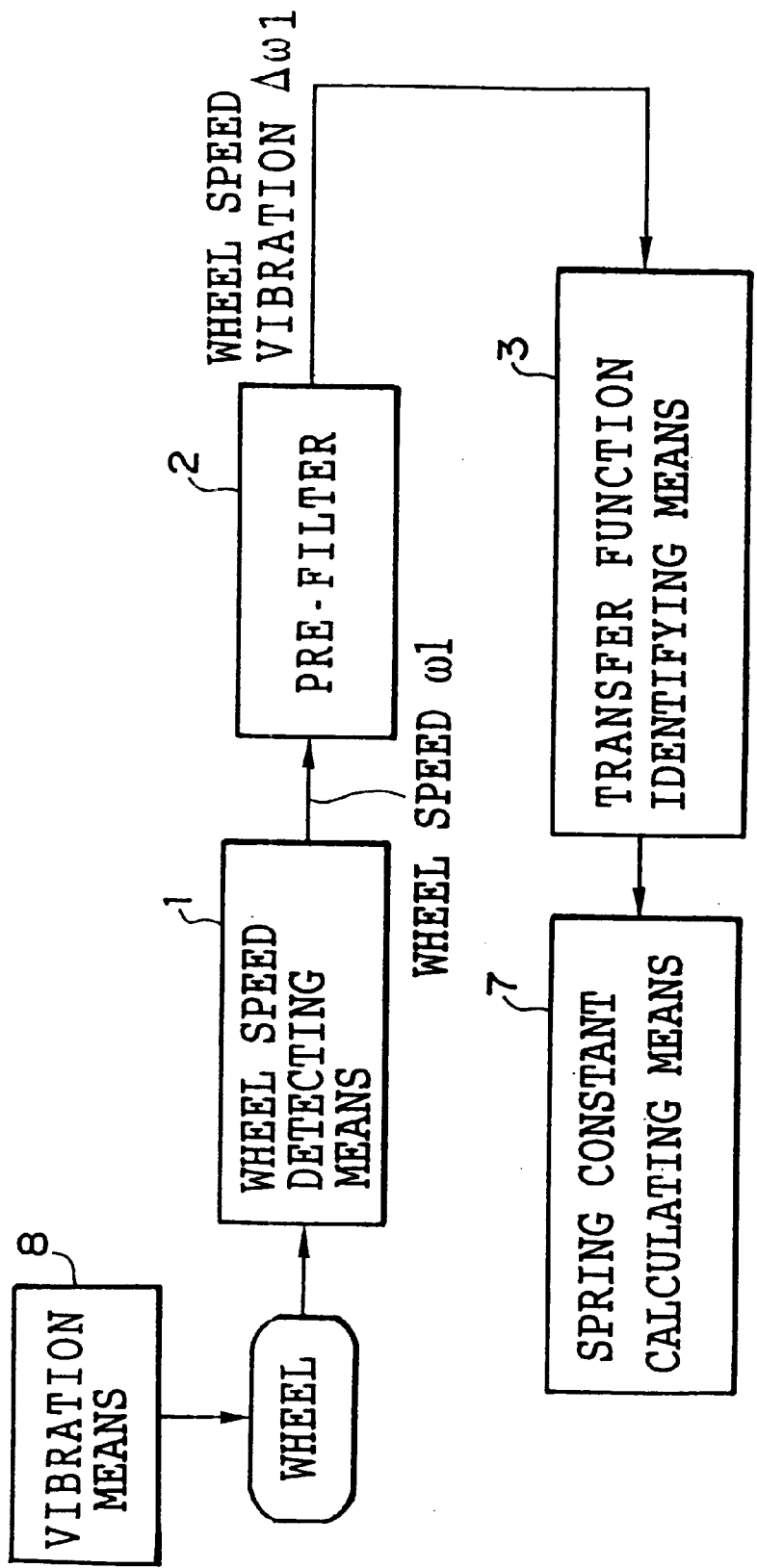
FIG. 15 is a block diagram which shows a second aspect relating to the third embodiment of the present invention.

As shown in FIG. 15, the second aspect is structured such that in the same manner as that of the second embodiment, spring constant calculating means 7 for calculating the physical quantity in connection with the torsion spring constant of the tire on the basis of the parameter identified by the transfer function identifying means 3 is connected to an output end of the transfer function identifying means 3.

Next, a flow of the calculation by the spring constant calculating means 7 will be described below.

When the parameter of the transfer function is identified by the transfer function identifying means 3 shown in FIG. 15, the identified transfer function can be expressed by the following formula.

$$G(s) = \frac{b_2}{s^2 + \hat{a}_1 s + \hat{a}_2} \quad (54)$$

Accordingly, the following formula can be obtained from the corresponding relation to the vibration model expressed by the (11) formula.

$$\hat{a}_2 = K/J_1 \quad (55)$$

Then, in the spring constant calculating means 7, in accordance with the (55) formula, the torsion spring constant K of the tire is calculated from the estimated value (^ is added) of the parameter $a_2$ identified by the transfer function identifying means 3 and the predetermined moment of inertia $J_1$ in the rim end.

Further, the following formula expresses the resonance frequency of the wheel resonance system.

$\sqrt{a_2} = \sqrt{K/J_1}$ (56)

Then, in the spring constant calculating means 7, the resonance frequency of the wheel resonance system can also be calculated by the (44) formula as one of the physical quantities in connection with the torsion spring constant K of the tire.

Further, since the torsion spring constant K of the tire and the resonance frequency obtained by this aspect are dependent on the tire air pressure, they can be used as the information for a tire air pressure judging apparatus. Further, there is an advantage that the vibration frequency can be provided with respect to the antilock brake control apparatus for controlling the braking force on the basis of the vibration of the braking force.

In this case, in accordance with this aspect, the signal waveform of the vibration input can be made any one of the waveforms shown in FIGS. 14A, 14B and 14C as in the first aspect.

As mentioned above, in the third embodiment, since the output response equal to or more than a fixed value can always be obtained by applying the vibration torque $\Delta T_1$ to the wheel resonance system even in the case that the amplitude of the wheel speed vibration $\Delta \omega_1$ is made small due to the little unevenness of the road surface, the estimation of the $\mu$ Gradient and the torsion spring constant of the tire can be accurately performed without relation to the road surface condition.

(Fourth Embodiment)

A wheel condition estimating apparatus in accordance with a fourth embodiment is structured such as to identify the transfer function of the wheel resonance system from the detected vibration input and output response in the case that the vibration torque $\Delta T_1$ is input to the wheel resonance system as the vibration input, and has a first aspect for calculating the $\mu$ Gradient and a second aspect for calculating the torsion spring constant of the tire.

Figure 16:
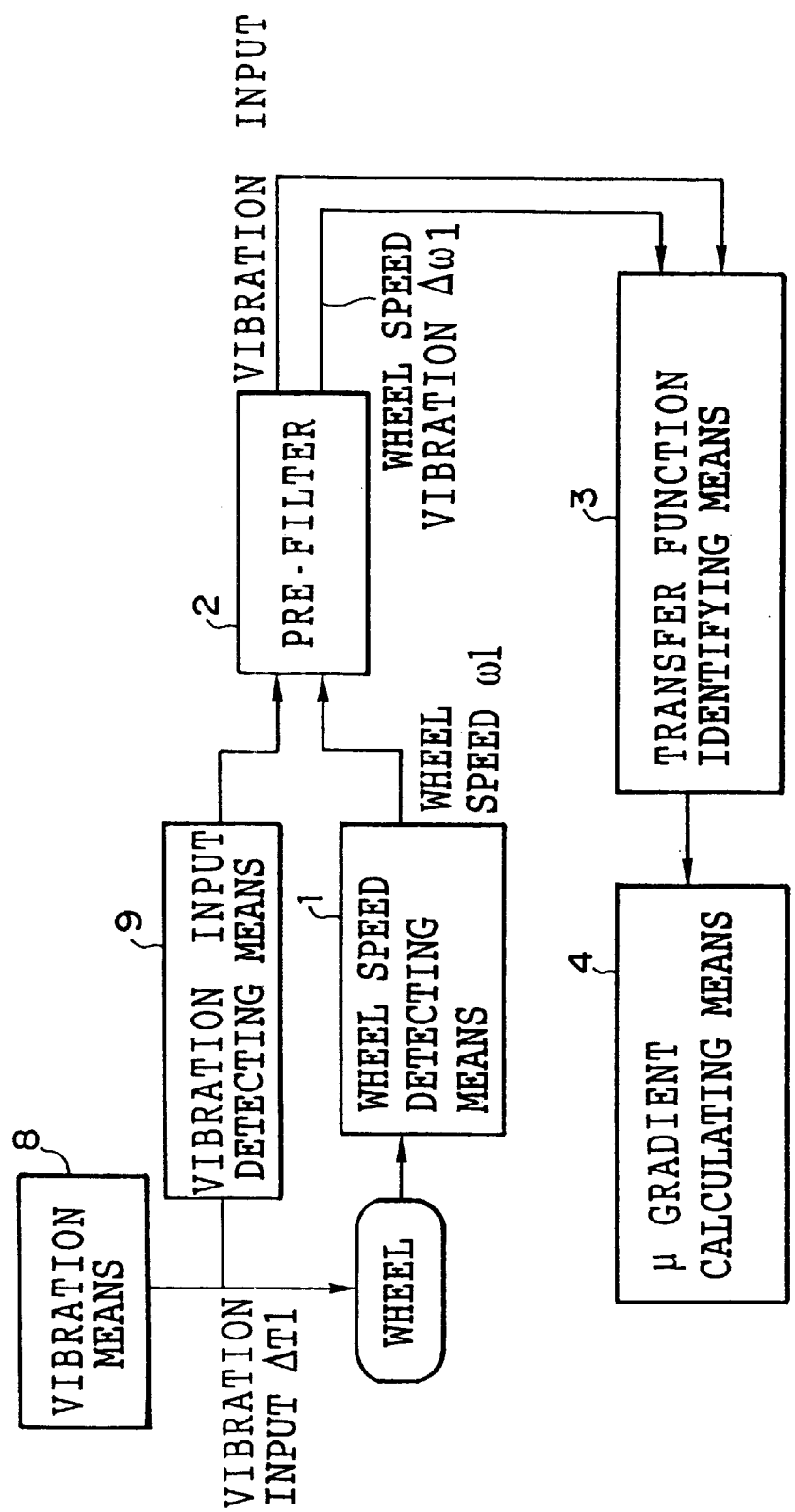
FIG. 16 is a block diagram which shows a first aspect relating to a fourth embodiment of the present invention.

A structure of a first aspect of the wheel condition estimating apparatus in accordance with the first aspect of the fourth embodiment is shown in FIG. 16. In this case, the same reference numerals are attached to the same components as those of the third embodiment shown in FIG. 13, and the detailed explanation will be omitted.

As shown in FIG. 16, this wheel condition estimating apparatus is further provided with a vibration input detecting means 9 for detecting an actual value of the vibration torque $\Delta T_1$ as the vibration input given to the wheel by the vibrating means 8. Then, the pre-filter 2 gives a predetermined filter treatment to the detected vibration input together with the wheel speed $\omega_1$, and the transfer function identifying means 3 estimates the parameter of the transfer function from the filter-treated vibration input component and the wheel speed vibration $\Delta \omega_1$.

A method of detecting the vibration input by the vibration input detecting means 9 is structured, for example, in the case of vibrating the Braking torque, such as to detect the brake pressure (the wheel cylinder pressure) corresponding to the Braking torque by means of the pressure sensor or the like, to convert it into the Braking torque including the vibration component by multiplying a predetermined constant, and to subtract the value of the average Braking torque from this Braking torque, so that only the vibration torque component is extracted as the vibration input.

Next, a calculation formula on which the transfer function identifying means 3 in accordance with this embodiment depends will be introduced. In this case, also in accordance with this embodiment, the calculation of the pre-filter 2 is performed in such a manner as to be included in the calculation of the transfer function identifying means 3.

At first, a quadratic model in which the transfer function to be identified in the fourth embodiment is made such that the vibration torque $\Delta T_1$ is a vibration input and the wheel speed vibration $\Delta \omega_1$ detected by the pre-filter 2 at that time is an output response is prepared. Accordingly, the vibration model expressed by the following formula is supposed.

$$\Delta \omega_1 = \frac{\sum_{i=0}^{2} b_i s^{2-i}}{\sum_{i=0}^{2} a_i s^{2-i}} \Delta T_1 + v, \; a_0 = 1 \qquad (57)$$

In the above formula, $\Delta T_1$ is an actual vibration torque detected by the vibration input detecting means 9 and v is an observation noise included at a time of observing the wheel speed signal. The following formula is obtained by modifying the (57) formula.

$$\sum_{i=0}^{2} a_i s^{2-i} y(t) = \sum_{i=0}^{2} b_i s^{2-i} \Delta T_1 + \sum_{i=0}^{2} a_i s^{2-i} v(t) \qquad (58)$$

At first, by applying the pre-filter of the (14) formula to the (58) formula, the obtained formula is made discrete. At this time, $\Delta \omega_1$, $\Delta T_d$ and v are expressed as the discrete data $\Delta \omega_1(k)$, $\Delta T_d(k)$ and v(k) (in which k is a sampling number: k=1, 2, 3, . . . ) sampled at every sampling period $T_s$. Further, the Laplace operator s can be made discrete by the bilinear transformation mentioned above using a delayed calculating component d.

Further, since a dimension m of the pre-filter is desired to be two or more, in accordance with this embodiment, it is set that m=2 by taking a calculating time into consideration, so that the following formula can be obtained.

$$\sum_{i=0}^{2} a_i \xi_{yi}(k) = \sum_{i=0}^{2} b_i \xi_{ui}(k) + \sum_{i=0}^{2} a_i \xi_{vi}(k) \qquad (59)$$

wherein $$\xi_{yi}(k) = \left(\frac{T_s}{2}\right)^i (1+d)^i (1-d)^{2-i} F_0(d) \Delta \omega_1(k) \qquad (60)$$

$$\xi_{ui}(k) = \left(\frac{T_s}{2}\right)^i (1+d)^i (1-d)^{2-i} F_0(d) \Delta T_1(k) \qquad (61)$$

$$\xi_{vi}(k) = \left(\frac{T_s}{2}\right)^i (1+d)^i (1-d)^{2-i} F_0(d) v(k) \qquad (62)$$

$$F_0(d) = \frac{1}{\sum_{i=0}^{n} c_i \left(\frac{T_s}{2}\right)^i (1+d)^i (1-d)^{2-i}} \qquad (63)$$

Still further, in order to identify the transfer function from each of the discrete data of the wheel speed vibration $\Delta \omega_1$ on the basis of the least square method, the (47) formula is converted into the following formula in such a manner as to be a linear function type with respect to the parameter to be identified. In this case, "$T$" is set to be a transposition of a matrix.

$$\xi_{y0} = \zeta^T(k)\theta + r(k) \qquad (64)$$

wherein $$\zeta(k) = [-\xi_{y1}(k) - \xi_{y2}(k) \xi_{u0}(k) \xi_{u1}(k) \xi_{u2}(k)]^T$$

$$\theta = [a_1 a_2 b_0 b_1 b_2]^T$$

$$r(k) = \sum_{i=0}^{2} a_i \xi_{vi}(k) \quad (65)$$

In the above formula, θ is a parameter of a transfer function to be identified. However, in accordance with this embodiment, since the $\Delta T_1$ is detected, it is understood that the coefficients $b_0$, $b_1$ and $b_2$ can be also estimated as is different from the embodiment mentioned above.

Next, an operation of a first aspect in accordance with the fourth embodiment will be described below.

In the transfer function identifying means 3, the unknown parameter θ is estimated by applying the least square method to each of the data obtained by successively applying the discrete data of the detected wheel speed vibration $\Delta \omega_1$ to the formula (64), thereby identifying the transfer function.

Concretely speaking, the detected wheel speed vibration $\Delta \omega_1$ is converted into the discrete data $\Delta \omega(k)$ (k=1, 2, 3, ... ), and the data is sampled at a number of N points. Then, by using the above formulas ζ(k) and $\xi_{y0}(k)$, the estimated values (^ is added) of the parameters $a_1$ and $a_2$ of the transfer function are calculated in accordance with the same calculation as that of the (24) formula and thereafter in the first embodiment. In this case, in this embodiment, the successive type least square method and the method of observed value of concomitant variable may be employed. In the case of using the method of observed value of concomitant variable, when the vibration input can be detected as in this embodiment, the estimated value (^ is added) of the true output x(k) is successively calculated by using the parameter of the identified transfer function in accordance with the following formula.

$$\hat{x}(k) = \frac{\sum_{i=0}^{2} \hat{b}_i \left(\frac{T_s}{2}\right)^i (1+d)^i (1-d)^{2-i}}{\sum_{i=0}^{2} \hat{a}_i \left(\frac{T_s}{2}\right)^i (1+d)^i (1-d)^{2-i}} \Delta T_1 \quad (66)$$

Accordingly, the observed value of concomitant variable can be constructed in the following formula by using this estimated value.

$$\xi_{xi}(k) = \left(\frac{T_s}{2}\right)^i (1+d)^i (1-d)^{2-i} F_0(d) \hat{x}(k) \quad (67)$$

$$m(k) = [-\xi_{x1}(k) - \xi_{x2}(k) \xi_{u0}(k) \xi_{u1}(k) \xi_{u2}(k)]^T \quad (68)$$

Further, a formula structured such as to delay the following formula in such a manner as to have no relative relation with the formula error r(k) is used.

$$\zeta(k) = [-\xi_{y1}(k) - \xi_{y2}(k) \xi_{u0}(k) \xi_{u1}(k) \xi_{u2}(k)]^T \quad (69)$$

Accordingly, the following formula is given, in which L is a delayed time.

$$m(k) = [-\xi_{y1}(k-L) - \xi_{y2}(k-L) \xi_{u0}(k-L) \xi_{u1}(k-L) \xi_{u2}(k-L)]^T \quad (70) \,(70)$$

Further, in accordance with this aspect, as in the second aspect of the first embodiment, the coefficient of the prefilter 2 can be properly changed in correspondence to the parameter of the identified transfer function.

Still further, the waveform of the vibration input may be structured in such a manner as shown in FIGS. 14A, 14B and 14C. In the case that the resonance frequency at a time when the tire is gripped on the road surface in this aspect (hereinafter, refer to "tire resonance frequency") is apparently known, it may be vibrated by the tire resonance frequency. In accordance with the experimental research by the inventors, it is known that the vibration model expressed by the formula (11) becomes the following formula.

$$J_1 \approx J_2 \quad (71)$$

Accordingly, when the transmitting characteristic from the vibration input to the output response at a time of being vibrated by the tire resonance frequency is calculated on the basis of the can be obtained.

$$\Delta \omega_1 = \frac{D_0}{2KJ_1} \Delta T_1 \quad (72)$$

Then, the transfer function is identified as the following formula by using the least square method in the transfer function identifying means 3 by setting the transfer function to be identified as $\Delta \omega_1 = G_d \Delta T_1$ (73).

$$\hat{\theta}(N) = \left[\sum_{k=1}^{N} \rho^{N-k} \zeta(k) \zeta^T(k)\right]^{-1} \left[\sum_{k=1}^{N} \rho^{N-k} \zeta(k) \xi_{y0}(k)\right] \quad (74)$$

wherein $$\zeta(k) = \xi_{u0}$$

$$\hat{\theta} = G_d \quad (75)$$

$$\xi_{y0}(k) = \Delta \omega_1(k) \quad (76)$$

$$\xi_{u0}(k) = \Delta T_1(k) \quad (77)$$

Further, the least square method mentioned above can be calculated as the successive type least square method as in the following formula.

$$\hat{\theta}(N) = \hat{\theta}(N-1) + h(N)[\xi_{y0}(N) - \zeta^T(N)\hat{\theta}(N-1)] \quad (78)$$

$$h(N) = \frac{P(N-1)\zeta(N)}{\rho + \zeta^T(N)P(N-1)\zeta(N)} \quad (79)$$

$$P(N) = \frac{1}{\rho}\{I - h(N)\zeta^T(N)\}P(N-1) \quad (80)$$

In the above formula, ρ is a so-called forgetting factor,

In the above formula, ρ is a so-called forgetting factor, and is normally set to be a value of 0.95 to 0.99. At this time, an initial value may be set to be the following formula.

θ(−1)=0, P(−1)=α*I*, α: sufficiently large positive number

Further, a further accurate estimated value can be obtained by applying a modified least square method such as the method of observed value of concomitant variable or the like to the least square method mentioned above.

Then, the estimated value of the parameter $G_d$ of the identified transfer function is expressed by the following formula in accordance with the corresponding relation between the formulas (72) and (73).

$$\hat{G}_d = \frac{D_0}{2KJ_1} \tag{81}$$

Accordingly, the $\mu$ gradient calculating means 4 calculates the physical quantity in connection with the easiness of the slip $D_0$ of the road surface in accordance with the (81) formula by using the estimated value of the $G_d$.

In this case, the frequency of the vibration input may be the resonance frequency calculated by the torsion spring constant of the tire which is calculated in accordance with the second embodiment of the present invention and the second aspect of the third embodiment. In the case of vibrating by only the tire resonance frequency as mentioned above, since the power of the vibration input can be concentrated to the frequency component, an SN ratio of the output from the vibration input detecting means 9 and the output response detecting means 1 is improved, so that there is an advantage that the calculating accuracy is improved.

Next, as a second aspect, a wheel condition estimating apparatus further comprising a physical quantity in connection with the torsion spring constant of the tire in the vibration model in the first aspect mentioned above, will be described below with reference to a block diagram shown in FIG. 17.

Figure 17:
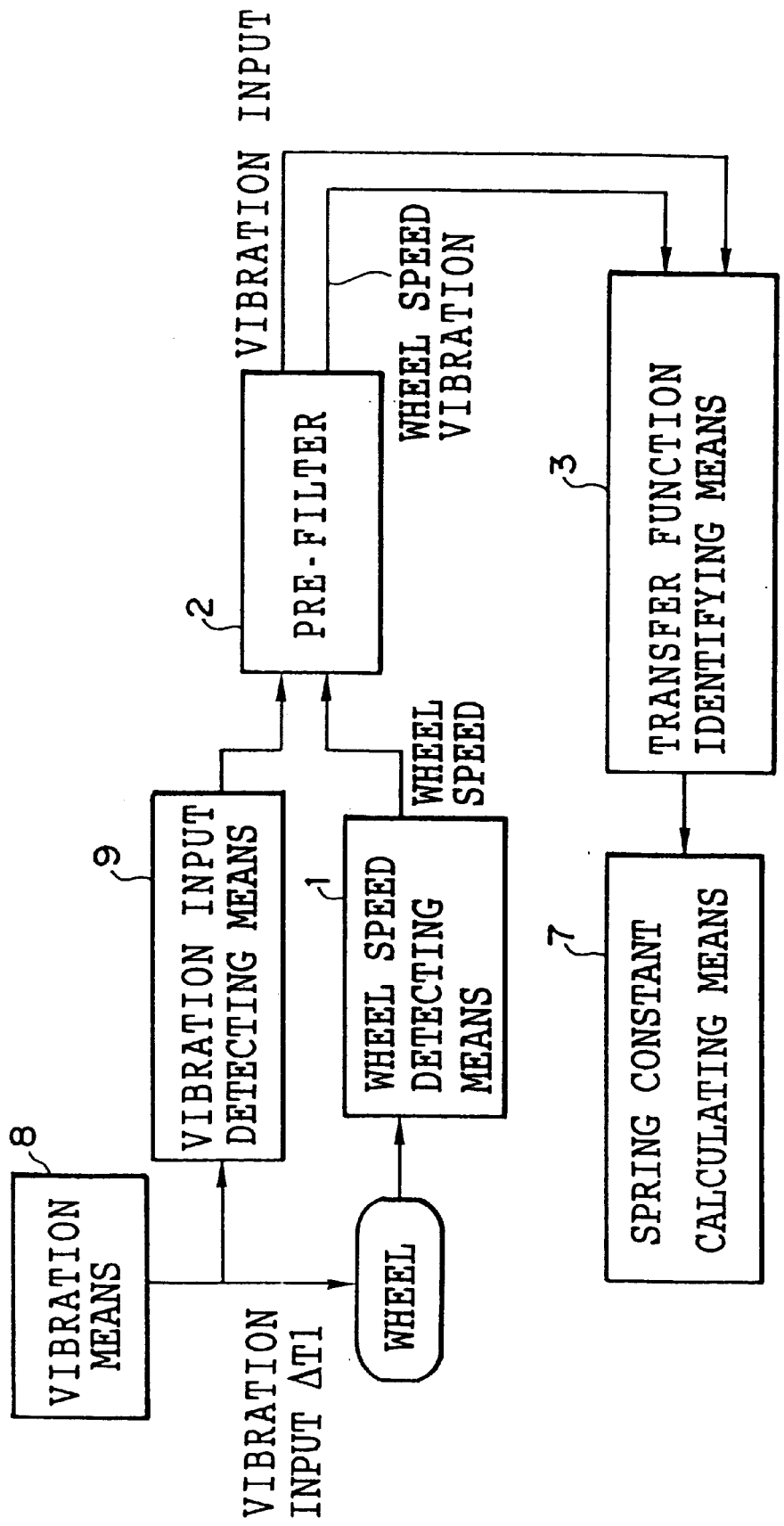
FIG. 17 is a block diagram which shows a second aspect relating to the fourth embodiment of the present invention.

As shown in FIG. 17, the second aspect is structured such that in place of the $\mu$ gradient calculating means 4 in accordance with the first aspect, the spring constant calculating means 7 for calculating the physical quantity in connection with the torsion spring constant of the tire on the basis of the parameter identified by the transfer function identifying means 3 is connected to the output end of the transfer function identifying means 3.

Next, a flow of the calculation by the spring constant calculating means 7 will be described below.

When the parameter of the transfer function is identified by the transfer function identifying means 3 shown in FIG. 17, the identified transfer function can be expressed by the following formula.

$$\Delta\omega_1 = \frac{\sum_{i=0}^{2} b_i s^{2-i}}{\sum_{i=0}^{2} a_i s^{2-i}} \Delta T_1 + v, a_0 = 1 \tag{82}$$

Accordingly, the following formula can be obtained from the corresponding relation to the vibration model expressed by the (11) formula.

$$\hat{a}_2 = K/J_1 \tag{83}$$

Then, in the spring constant calculating means 7, in accordance with the (83) formula; the torsion spring constant K of the tire is calculated from the estimated value (^ is added) of the parameter $a_2$ identified by the transfer function identifying means 3 and the predetermined moment of inertia $J_1$ in the rim end.

Further, the following formula expresses the resonance frequency of the wheel resonance system.

$$\sqrt{\hat{a}_2} = \sqrt{K/J_1} \tag{84}$$

Then, in the spring constant calculating means 7, the resonance frequency of the wheel resonance system can also be calculated by the (44) formula as one of the physical quantities in connection with the torsion spring constant K of the tire.

Further, since the torsion spring constant K of the tire and the resonance frequency obtained by this aspect are dependent on the tire air pressure, they can be used as the information for a tire air pressure judging apparatus. Further, there is an advantage that the vibration frequency can be provided with respect to the antilock brake control apparatus for controlling the breaking pressure on the basis of the vibration of the Braking force.

In this case, also in accordance with this aspect, the signal waveform of the vibration input can be made any one of the waveforms shown in FIGS. 14A, 14B and 14C as in the first aspect except the case of vibrating by the tire resonance frequency.

As mentioned above, in the fourth embodiment, since the vibration input actually detected is used, more transfer function parameters can be estimated.

(Fifth Embodiment)

A wheel condition estimating apparatus in accordance with a fifth embodiment is structured such as to select an output response including a large amount of a periodical signal among the output responses, identify a transfer function in a wheel resonance system on the basis of the selected output response, and calculate a $\mu$ gradient.

Figure 18:
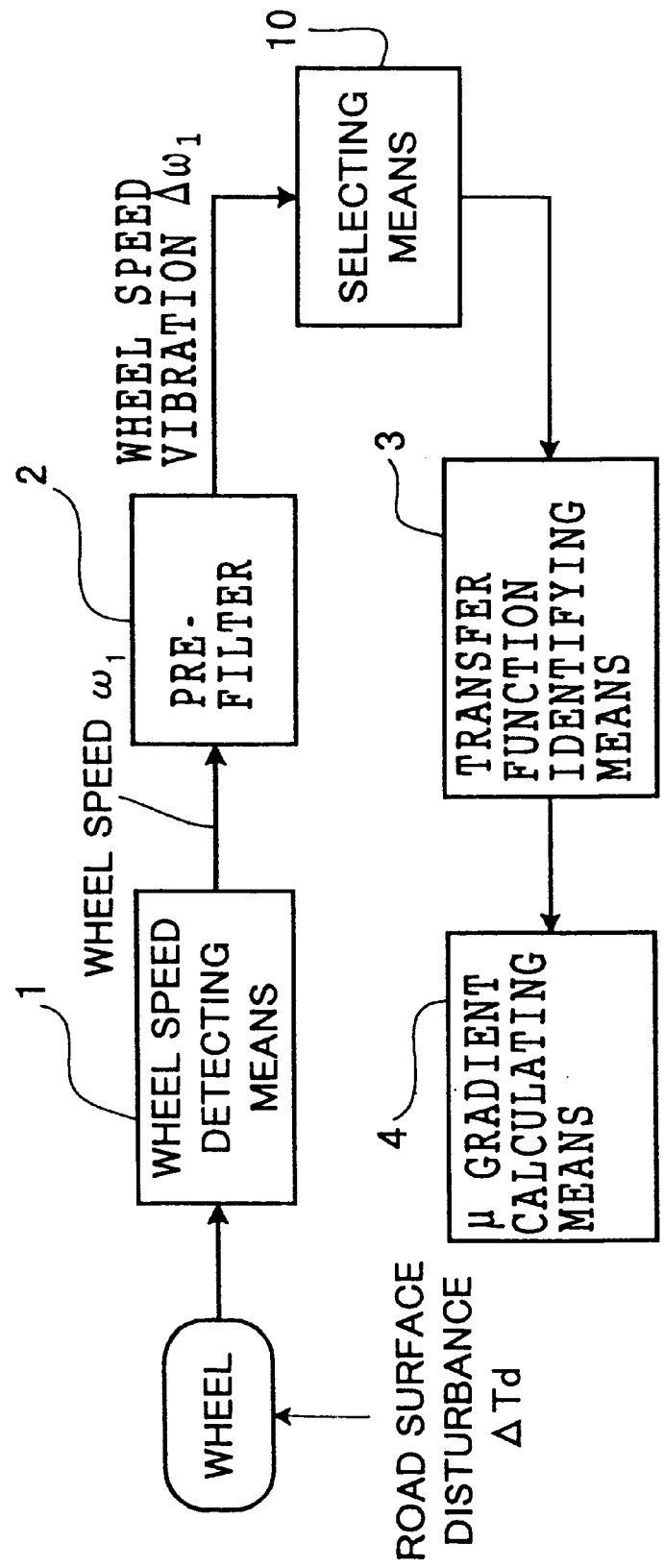
FIG. 18 is a block diagram which shows a structure relating to a fifth embodiment of the present invention.

A structure of the wheel condition estimating apparatus in accordance with the fifth embodiment will be described below with reference to a block diagram shown in FIG. 18. As shown in FIG. 18, the structure is the same with the structure of the first embodiment except that selecting means 10 is provided between the pre-filter 2 and the transfer function identifying means 3, the selecting means 10 selects a periodical signal among the wheel speed vibration $\Delta\omega_1$ output from the pre-filter 2 and outputs the selected output response to the transfer function identifying means 3.

Figure 19:
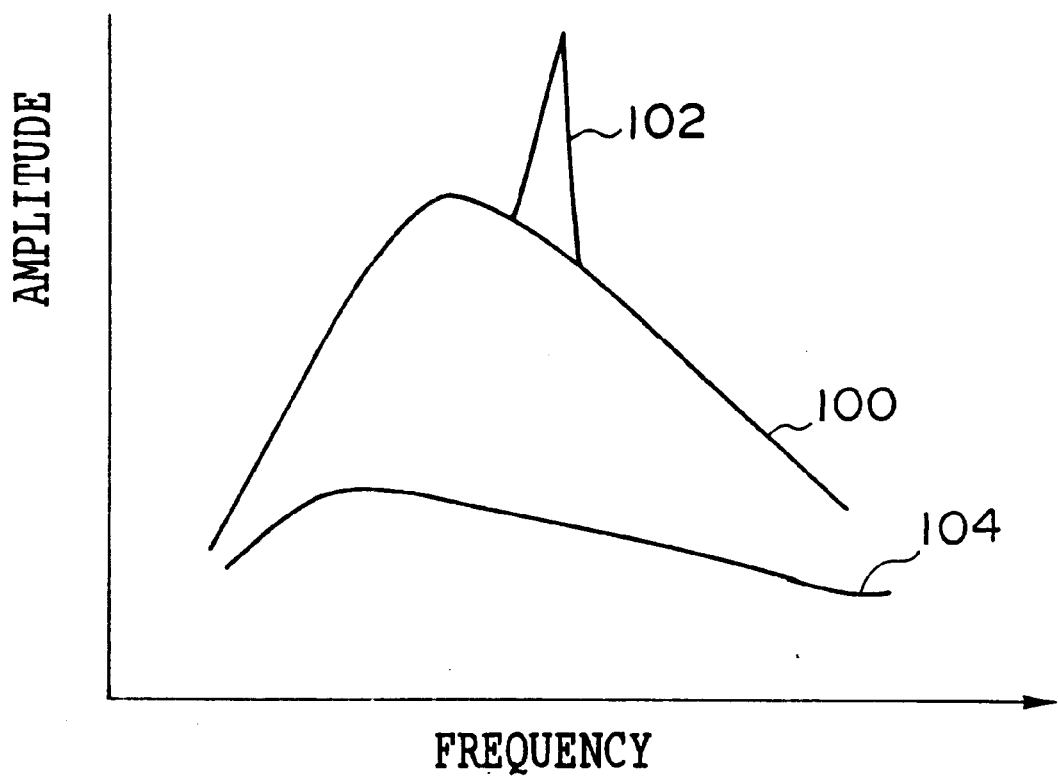
FIG. 19 is a graph which shows two signals comprising a periodical signal and a non-periodical signal.

In the case that the wheel speed vibration $\Delta\omega_1$ is a periodical signal, when the wheel speed vibrations $\Delta\omega_1$ input for a predetermined period are plotted on the frequency-amplitude (power) graph, it is expected that a graph shown by a reference numeral 100 in FIG. 19 can be obtained.

However, When the transfer function in the wheel resonance system is identified by using an output 102 having an unexpectedly large amplitude (for example, a returning noise by an aliase and the like) and an output 104 in which a periodical change does not significantly appear (an output having a small S/N ratio),and the $\mu$ gradient is calculated, there is a great dispersion and an estimating accuracy is deteriorated. Accordingly, it is necessary to select the output response corresponding to the periodical signal.

Figure 20A:
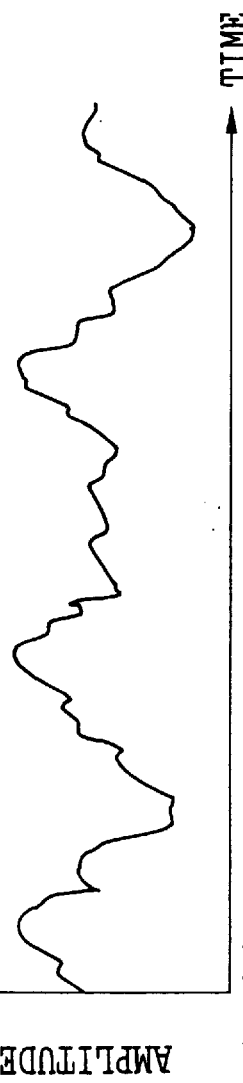
FIGS. 20A and 20C are graphs which show a non-periodical signal.
Figure 20B:
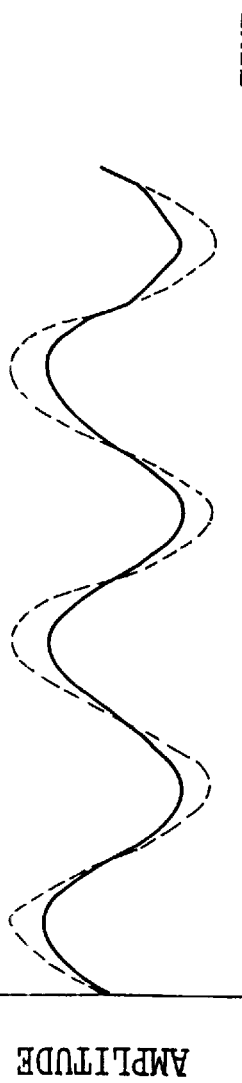
FIG. 20B is a graph which shows a periodical signal.
Figure 20C:
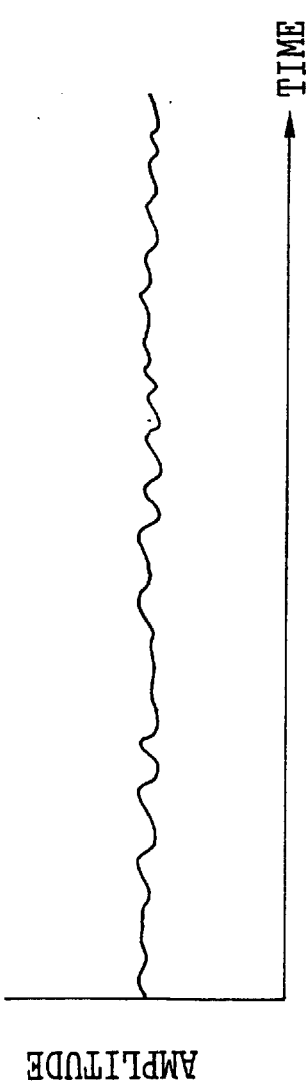

In comparison with FIG. 20B which graphs the periodical output 100 in a time sequence manner, the output 102 having an unexpectedly large amplitude has a bad periodical characteristic when graphed in a time sequence manner as shown in FIG. 20A. Further, the output 104 in which the periodical change does not significantly appear has a very bad periodical characteristic when graphed in a time sequence manner as shown in FIG. 20C.

On the contrary, the periodical output 100 shown by a solid line in FIG. 20B and the value (shown by a dot line in FIG. 20B) obtained by converting the periodical output 100 such that the periodical portion of the periodical output 100 changes in correspondence to the change of the periodical output 100 have a certain relation.

Figure 21:
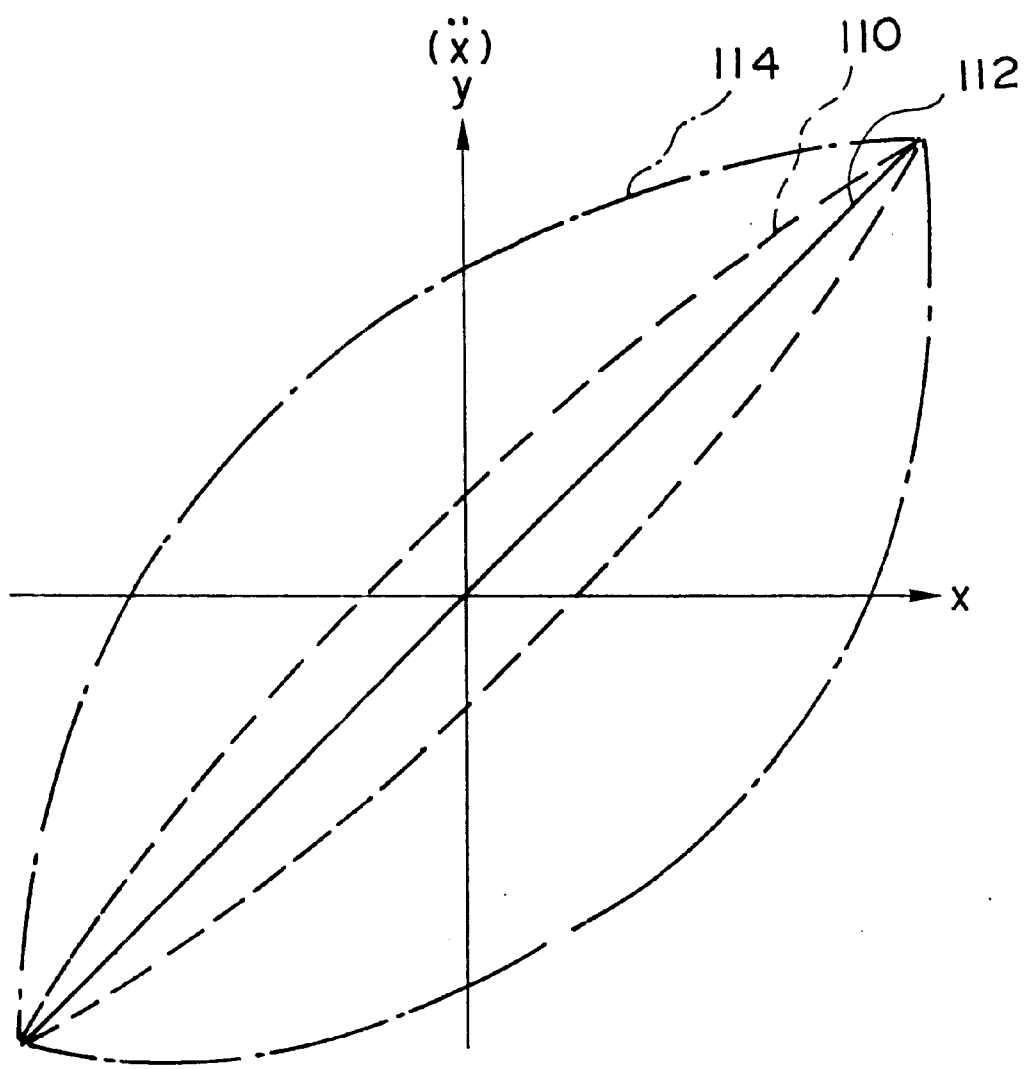
FIG. 21 is a graph which shows a relationship between an output response x and a value y obtained by converting the output response such that a periodical portion changes in correspondence to a change of the output response.

Accordingly, as explained in the embodiment mentioned above, when the periodical output 100 is set to be $\xi_{y0}$, and the value obtained by converting the periodical output 100 in the above manner, for example, performing an even number of (for example, two times) differentiation (or any of an even number of difference, an even number of integration and an even number of summation) is set to be $\xi_{y2}$, a point defined by $\xi_{y0}(=x)$ and $\xi_{y2}(=y)$ is positioned within a certain range 110 as shown in FIG. 21. When the output is completely periodical, the point is positioned on a predetermined straight line 112 and the point is positioned in a wider range 114 as the periodical characteristic becomes worse.

Then, in accordance with this embodiment, the apparatus is structured such as to calculate the relational coefficient σ (the following formula (85)) between the output response $\xi_{y0}$ corresponding to the wheel speed vibration $\Delta\omega_1$ and the value $\xi_{y2}$ obtained by converting the output response $\xi_{y0}$ in a manner mentioned above, and select the output response corresponding to the periodical signal on the basis of the relational coefficient σ.

$$\sigma = \frac{-\sum_{k=1}^{N} \rho_c^{N-k} \xi_{y0}(k) \xi_{y2}(k)}{\sqrt{\left(\sum_{k=1}^{N} \rho_c^{N-k} \xi_{y0}(k) \xi_{y0}(k)\right)\left(\sum_{k=1}^{N} \rho_c^{N-k} \xi_{y2}(k) \xi_{y2}(k)\right)}} \quad (85)$$

In the above formula, $\rho_c$ is a forgetting factor and N is a number of the output responses.

Figure 22:
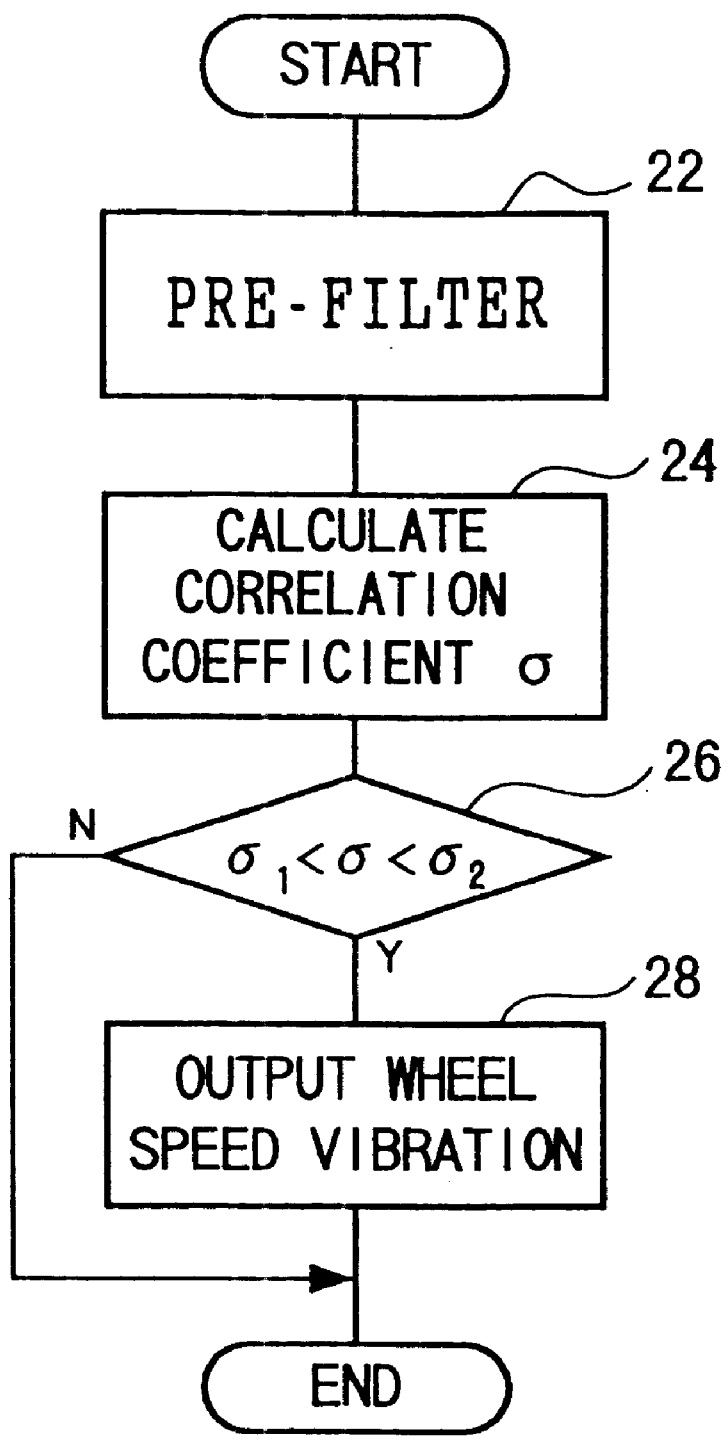
FIG. 22 is a flow chart which shows a selecting operation routine performed by selecting means.

Accordingly, the selecting means 10 performs a selecting operation routine shown in FIG. 22 at every time when the wheel speed vibration $\Delta\omega_1$ is input from the pre-filter 2.

In a step 22, a pre-filter operation (a band area passing operation) is performed. In this case, a band area of the pre-filter operation is wider than a band area of the pre-filter 2.

In a step 24, the relational coefficient σ (the formula (85)) between the output response $\xi_{y0}$ corresponding to the wheel speed vibration $\Delta\omega_1$ after the pre-filter operation and the value $\xi_{y2}$ obtained by converting the output response $\xi_{y0}$ in a manner mentioned above is calculated.

In a step 26, whether or not the wheel speed vibration $\Delta\omega_1$ input at this time is a periodical signal is determined by determining whether or not the calculated relative coefficient σ is within a predetermined range ($\sigma_1 < \sigma < \sigma_2$)

In the case that the calculated relative coefficient σ is not within the predetermined range, the wheel speed vibration $\Delta\omega_1$ input at this time is not a periodical signal, so that this routine is finished. Accordingly, since the wheel speed vibration $\Delta\omega_1$ input at this time is not input to the transfer function identifying means 3, it is prevented that the transfer function in the wheel resonance system is identified on the basis of the non-periodical signal so as to calculate the $\mu$ gradient.

On the contrary, in the case that the calculated relative coefficient σ is within the predetermined range, the wheel speed vibration $\Delta\omega_1$ input at this time is a periodical signal, so that in a step 28, the wheel speed vibration $\Delta\omega_1$ input at this time is input to the transfer function identifying means 3. Accordingly, the transfer function of the wheel resonance system is identified on the basis of the periodical signal and the $\mu$ gradient is calculated. Therefore, an accuracy of identifying the transfer function and an accuracy of estimating the $\mu$ gradient can be improved.

Figure 23A:
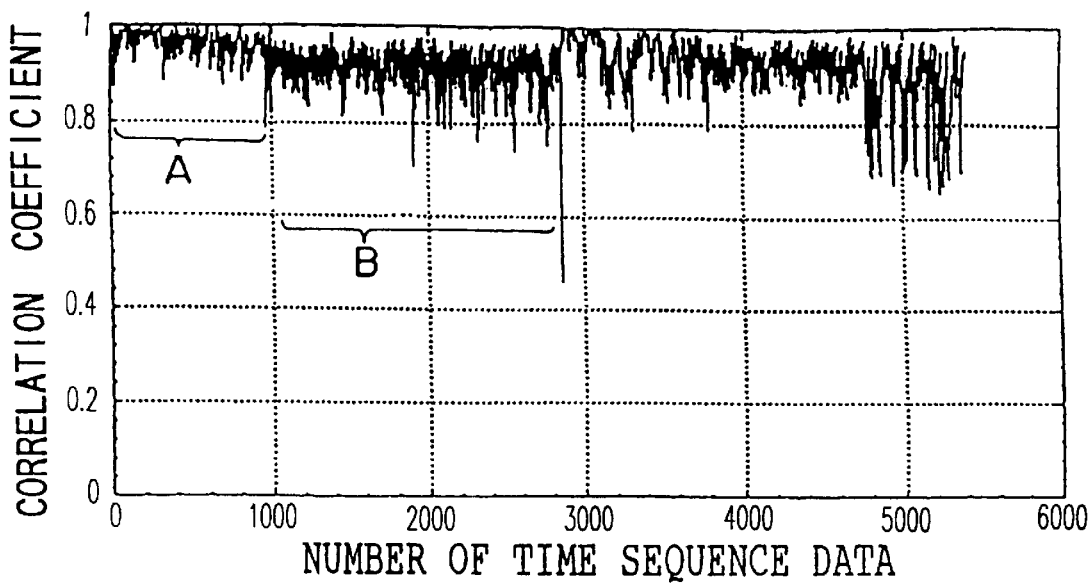
FIG. 23A is a graph which shows a relational coefficient between a periodical signal and a non-periodical signal (noise) in the time domain.
Figure 23B:
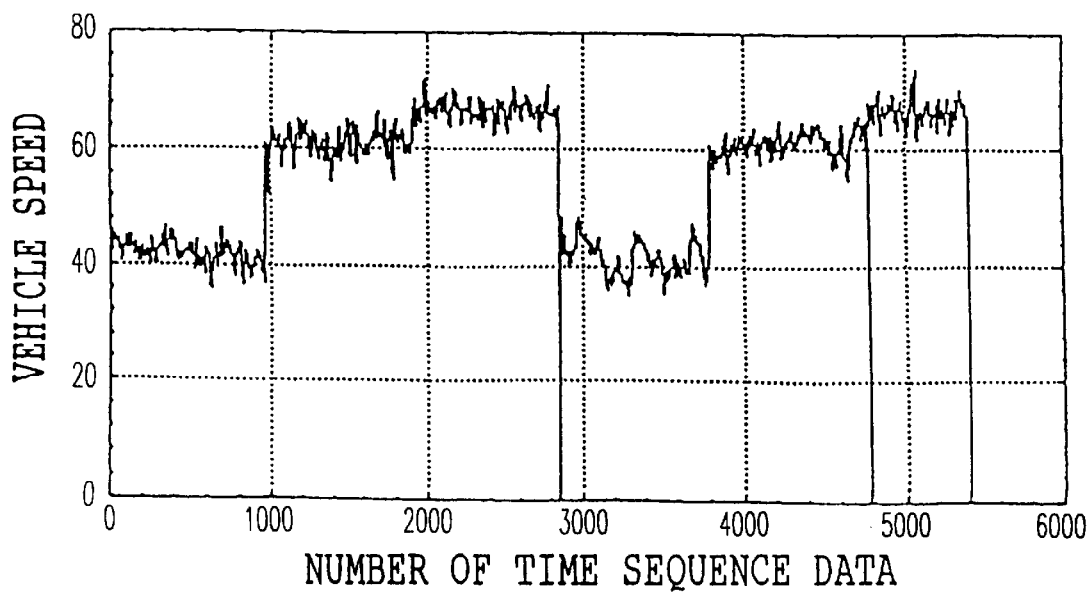
FIG. 23B is a graph which shows a vehicle speed of the periodical signal and the non-periodical signal (the noise) in the time domain.

In this case, even when the output having an unexpectedly large amplitude (a noise) is converted in the above manner, the converted value includes a lot of components other than the periodical portions. Accordingly, since the value obtained by converting the output having an unexpectedly large amplitude in the manner mentioned above does not change in correspondence to the change of the output response, the relative coefficient σ between the output having an unexpectedly large amplitude and the value obtained by converting the output response in the manner mentioned above is not within the predetermined range. For example, as shown in FIGS. 24A and 24B, a group of signals A (refer to FIG. 23A) having a frequency including a noise K within the predetermined range containing a frequency $F_1$ and having a relative coefficient σ outside a predetermined range is removed by the selecting means 10.

Figure 25:
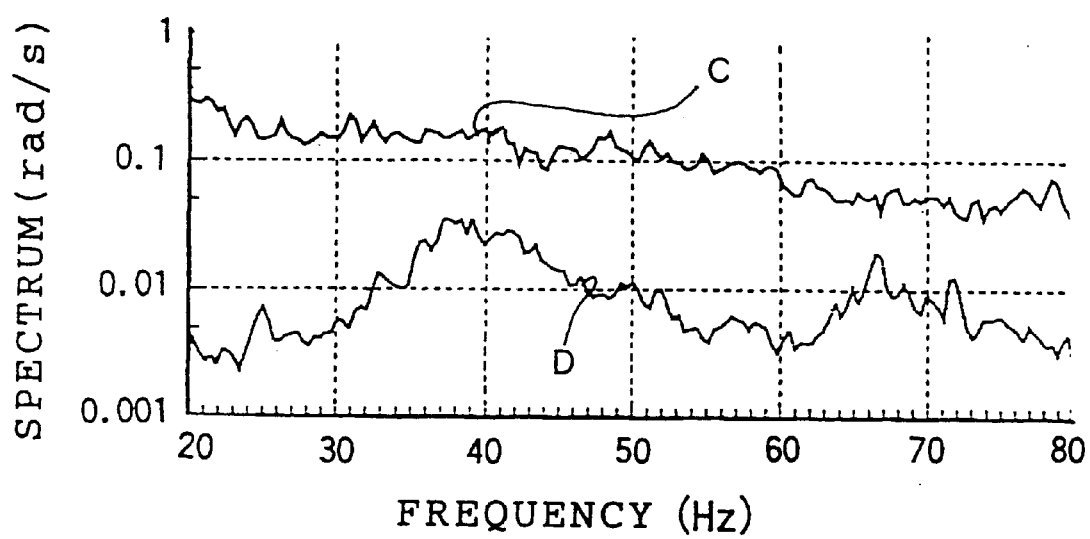
FIG. 25 is a graph which shows a relationship between frequency and spectrum of periodical signal and that of a signal in which periodical change does not appear remarkably.
Figure 26A:
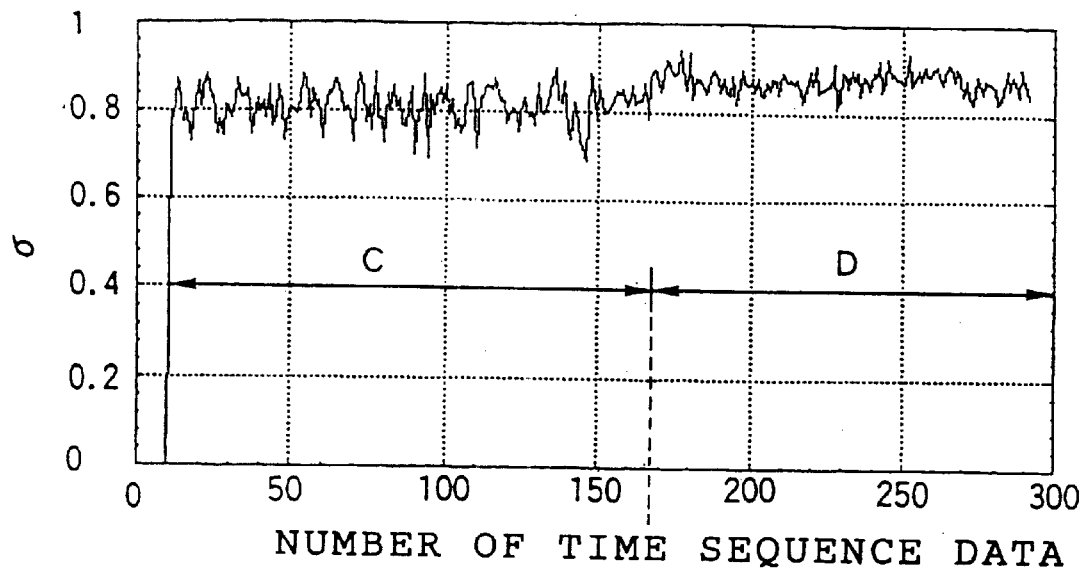
FIG. 26A is a graph showing, with passage of time, correlation coefficient of periodical signal and that of a signal in which periodical change does not appear remarkably.
Figure 26B:
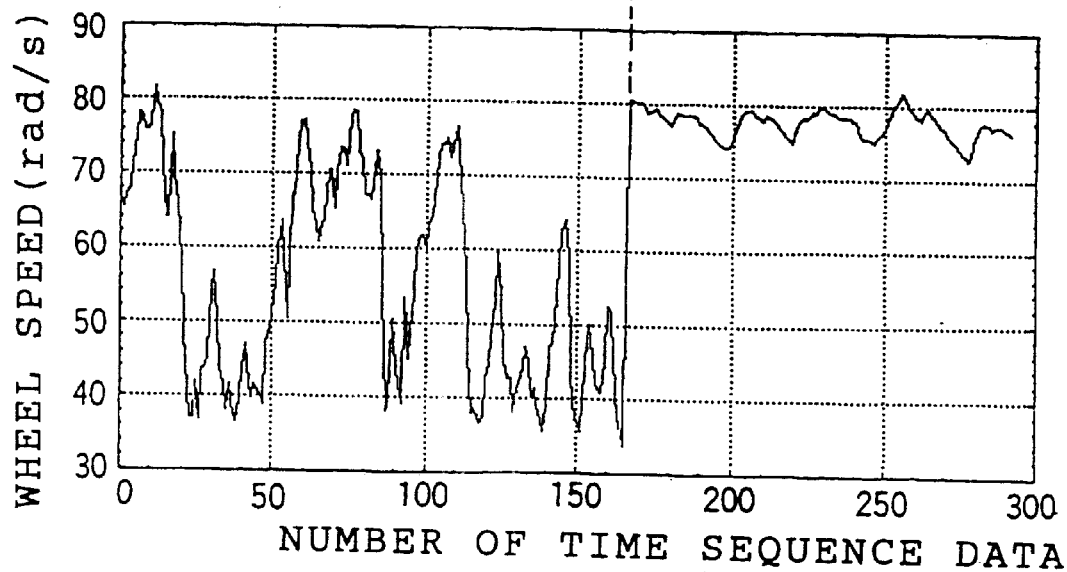
FIG. 26B is a graph showing, with passage of time, wheel speed corresponding to periodical signal and a signal in which periodical change does not appear remarkably.

Further, as shown in FIG. 25, in the value obtained by converting the output C in which a periodical change does not significantly appear in the manner mentioned above, there is a small number of components converted such as to change in correspondence to the change of the output response. Accordingly, the correlation coefficient σ between the output C in which the periodical change does not significantly appear and the converted value obtained by converting the output response in the manner mentioned above does not fall in the predetermined range mentioned above. For example, as shown in FIGS. 26A and 26B, a group of signals C having correlation coefficient σ falling outside the predetermined range (see FIG. 26A) is removed by the selecting means 10. The output C in which the periodical change does not significantly appear was obtained when the vehicle ran on a dirt road.

On the contrary, as shown in FIGS. 24C and 24D, a group of signals B (refer to FIG. 23A) having no noise component and having a relative coefficient σ within a predetermined range is selected by the selecting means 10 so as to be input to the transfer function identifying means 3. As shown in FIG. 25, in the value obtained by converting the periodical output D in the manner mentioned above, there is a large number of components converted such as to change in correspondence to the change of the output response. Accordingly, the correlation coefficient σ between the periodical output D and the value obtained by converting the output response in the manner mentioned above falls in the predetermined range mentioned above. For example, as shown in FIGS. 26A and 26B, a group of signals D having correlation coefficient σ falling within the predetermined range (see FIG. 26A) is not removed by the selecting means 10. Accordingly, the group of the signals D are input to the transfer function identifying means 3. The periodical output D shown in FIG. 25 was obtained when the vehicle ran on an asphalt road.

Accordingly, the unknown component mentioned above can be estimated on the basis of the output response from which the output response having an unexpectedly large magnitude and the output in which the periodical change does not significantly appear are removed.

In accordance with the fifth embodiment mentioned above, the $\mu$ gradient is calculated. However, the present invention is not limited to this, and a torsion spring constant of a tire may be calculated. Accordingly, this embodiment is not applied only to the first embodiment (the first aspect) mentioned above, but can be applied to all the embodiments mentioned above.

In each of the embodiments in accordance with the present invention mentioned above, since the structure is made such as to identify the transfer function of the continuous time model and to directly estimate the parameter of the transfer function, the problems mentioned above which is generated together with identifying the discrete time model can be avoided.

Further, since the wheel condition included in the vibration model established in the various kinds of running states is identified, the wheel condition in the various running conditions such as the braking, the driving, the steady running and the like can be estimated without limiting to the braking time.

The embodiments of the present invention are described above, however, the present invention is not limited to the embodiments mentioned above, and can be optionally and preferably changed within the scope of the present invention.

For example, in the first to fifth embodiments mentioned above, the explanation is given on the basis that the wheel resonance system is the quadratic vibration model expressed by the (11) and (12) formulas. However, it is apparent that the wheel condition estimation can be performed on the basis of the cubic vibration model expressed by the (5) and (6) formulas.

What is claimed is:

1. A wheel condition estimating apparatus for estimating a wheel condition in a wheel resonance system including a frictional characteristic between a tire and a road surface, comprising:
    a detector configured to detect an output response to a vibration input to the wheel resonance system; and
    an estimator configured to express a damping characteristic of said wheel resonance system during non-braking and braking from the vibration input to the output response by a vibration transfer characteristic model including at least a physical quantity relating to ease of a slipping between the tire and the road surface as an unknown component of a wheel condition, and to estimate at least said unknown component which substantially satisfies the output response detected by said detector on the basis of the vibration transfer characteristic model.

2. A wheel condition estimating apparatus according to claim 1, wherein said vibration transfer characteristic model is a transfer function of said wheel resonance system from the vibration input to the output response, and said estimator estimates said unknown component by identifying said transfer function.

3. A wheel condition estimating apparatus according to claim 2, wherein said estimator expresses said transfer function as a function of a parameter that expresses said physical quantity as said unknown component, estimates said parameter on the basis of said function and the output response detected by said detector, and estimates said unknown component on the basis of the estimated parameter.

4. A wheel condition estimating apparatus according to claim 1, further comprising a modifier configured to modify said vibration transfer characteristic model on the basis of the output response detected by said detector.

5. A wheel condition estimating apparatus according to claim 1, wherein said vibration transfer characteristic model further includes said physical quantity relating to a constant of a torsion spring of the tire as said unknown component of the wheel condition.

6. A wheel condition estimating apparatus according to claim 1, further comprising a vibration source configured to apply said vibration input to said wheel resonance system.

7. A wheel condition estimating apparatus according to claim 6, further comprising a vibration input detector configured to detect the vibration input applied to said wheel resonance system by said vibration source.

8. A wheel condition estimating apparatus according to claim 1, wherein said vibration input is at least one of a vibration torque to said wheel resonance system and a road surface vibration torque from a road surface to said wheel resonance system.

9. A wheel condition estimating apparatus according to claim 1, wherein said output response is a wheel speed.

10. A wheel condition estimating apparatus according to claim 1, further comprising:
    a calculator configured to calculate a determining value to determine whether or not the output response detected by said detector is a periodical output; and
    a selector configured to select a selected output response to be input to said estimator from the output response detected by said detector based on the basis of the determining value calculated by said calculator, wherein
    said estimator uses the selected output response selected by said selector to estimate said unknown component.

11. A wheel condition estimating apparatus according to claim 10, wherein said calculator calculates a correlation coefficient, said correlation coefficient describing a correlation between the output response detected by said detector and a converted value obtained by converting said selected output response such that the periodical portion of said output response changes in correspondence to the change of said output response, as said determining value.

12. A wheel condition estimating apparatus according to claim 11, wherein said conversion is performed by any of an even number of differentiation operations, an even number of difference operations, an even number of integration operations, and an even number of summation operations.

13. A wheel condition estimating apparatus according to claim 12, wherein said calculator calculates a relative coefficient $\sigma$ from the following formula:

$$\sigma = \frac{-\sum_{k=1}^{N} \rho_c^{N-k} \xi_{y0}(k) \xi_{y2}(k)}{\sqrt{\left(\sum_{k=1}^{N} \rho_c^{N-k} \xi_{y0}(k) \xi_{y0}(k)\right)\left(\sum_{k=1}^{N} \rho_c^{N-k} \xi_{y2}(k) \xi_{y2}(k)\right)}}$$

wherein:
    $\xi_{y0}$ is the output response;
    $\xi_{y2}$ is the converted value;
    $\rho_c$ is a forgetting factor;
    N is a number of the output responses detected by said detector; and
    $\sigma$ is the relative coefficient.

14. A wheel condition estimating apparatus according to claim 10, wherein said calculator calculates said determining value when a predetermined number of output responses are detected by said detector.

15. A wheel condition estimating apparatus according to claim 10, further comprising a modifier configured to modify said vibration model on the basis of the output response detected by said detector.

16. A wheel condition estimating apparatus according to claim 10, wherein said vibration model further includes, a physical quantity relating to a constant of a torsion spring of the tire as said unknown component of the wheel condition.

17. A wheel condition estimating apparatus according to claim 10, further comprising a vibration source configured to apply a vibration input to said wheel resonance system.

18. A wheel condition estimating apparatus according to claim 17, further comprising a vibration input detector configured to detect the vibration input applied to said wheel resonance system by said vibration source.

19. A wheel condition estimating apparatus according to claim 10, wherein said vibration input is at least one of a vibration torque to said wheel resonance system and a road surface vibration torque from a road surface to said wheel resonance system.

20. A wheel condition estimating apparatus according to claim 10, wherein said output response is a wheel speed.

21. The wheel condition estimating apparatus according to claim 1, wherein said estimator carries out a comparative examination of said transfer characteristic of the wheel resonance system near the resonance frequency of the wheel.

22. The wheel condition estimating apparatus according to claim 21, wherein the resonance frequency of the wheel is around 40 Hz.

23. A wheel condition estimating apparatus for estimating a wheel condition in a wheel resonance system including a frictional characteristic between a tire and a road surface, comprising:

a detector configured to detect an output response with respect to a vibration input to the wheel resonance system;

an estimator configured to express a damping characteristic of said wheel resonance system from the vibration input to the output response by a vibration transfer characteristic model including at least a physical quantity relating to ease of a slipping between the tire and the road surface as an unknown component of a wheel condition, and to estimate at least said unknown component which substantially satisfies the output response detected by said detector on the basis of the vibration transfer characteristic model;

a calculator configured to calculate a determining value to determine whether or not the output response detected by said detector is a periodical output on the basis of said output response;

a selector configured to select an output response to be input to said estimator from among the output responses detected by said detector on the basis of the determining value calculated by said calculator; and a vibration source configured to apply a vibration input to said wheel resonance system, wherein said estimator uses the output response selected by said selector at a time of estimating said unknown component.

24. A wheel condition estimating apparatus for estimating a wheel condition in a wheel resonance system including a frictional characteristic between a tire and a road surface, comprising:

a detector configured to detect an output response to a vibration input to the wheel resonance system; and an estimator configured to express a damping characteristic of said wheel resonance system during non-braking from the vibration input to the output response by a vibration transfer characteristic model including at least a physical quantity relating to ease of a slipping between the tire and the road surface as an unknown component of a wheel condition, and to estimate at least said unknown component which substantially satisfies the output response detected by said detector on the basis of the vibration transfer characteristic model.

* * * * *